US011920617B2

(12) United States Patent
Zha

(10) Patent No.: US 11,920,617 B2
(45) Date of Patent: Mar. 5, 2024

(54) FLUID SYSTEMS AND METHODS THAT ADDRESS FLOW SEPARATION

(71) Applicant: COFLOW JET, LLC, Cutler Bay, FL (US)

(72) Inventor: Gecheng Zha, Cutler Bay, FL (US)

(73) Assignee: COFLOW JET, LLC, Cutler Bay, FL (US)

( * ) Notice: Subject to any disclaimer, the term of this patent is extended or adjusted under 35 U.S.C. 154(b) by 115 days.

(21) Appl. No.: 17/628,258

(22) PCT Filed: Jul. 22, 2020

(86) PCT No.: PCT/US2020/043022
§ 371 (c)(1),
(2) Date: Jan. 19, 2022

(87) PCT Pub. No.: WO2021/016321
PCT Pub. Date: Jan. 28, 2021

(65) Prior Publication Data
US 2022/0403861 A1 Dec. 22, 2022

Related U.S. Application Data

(60) Provisional application No. 62/877,335, filed on Jul. 23, 2019.

(51) Int. Cl.
*F15D 1/00* (2006.01)
*F15D 1/04* (2006.01)
(Continued)

(52) U.S. Cl.
CPC ............... *F15D 1/008* (2013.01); *F15D 1/04* (2013.01); *F15D 1/12* (2013.01); *F15D 1/02* (2013.01); *F15D 1/08* (2013.01)

(58) Field of Classification Search
CPC ... F15D 1/008; F15D 1/04; F15D 1/12; F15D 1/02; F15D 1/08
(Continued)

(56) References Cited

U.S. PATENT DOCUMENTS 1,580,577 A 4/1926 Baumann
1,714,608 A 5/1929 Massey
(Continued)

FOREIGN PATENT DOCUMENTS

CA 3045209 A1 6/2018
CN 104176241 12/2014
(Continued)

OTHER PUBLICATIONS

"Fundamentals of Gas Turbine Engines" 2012; https://web.archive.org/web/20120905202602/https://www.cast-safety.org/pdf/3_engine_fundamentals.pdf (Year: 2012). 14 pages.
(Continued)

*Primary Examiner* — Minh Q Le
(74) *Attorney, Agent, or Firm* — MacMillan, Sobanski & Todd, LLC

(57) ABSTRACT

Fluid systems and methods for addressing fluid separation are described. An example fluid system includes a main body and a fluid pressurizer. The main body has a first portion, a second portion, an injection opening, a suction opening, a channel that extends from the suction opening to the injection opening, and a side wall. The first portion has a first axis that extends along the side wall. The second portion has a second axis that extends along the side wall at an angle relative to the first axis such that when fluid flows over the main body flow separation is defined adjacent to the second portion. The injection opening is disposed at a first location relative to said flow separation. The suction opening is disposed at a second location relative to said flow sepa-
(Continued)

ration. The channel extends from the suction opening to the injection opening.

12 Claims, 19 Drawing Sheets

(51) Int. Cl.
*F15D 1/12* (2006.01)
*F15D 1/02* (2006.01)
*F15D 1/08* (2006.01)

(58) Field of Classification Search
USPC .......................................................... 137/13
See application file for complete search history.

(56) References Cited

U.S. PATENT DOCUMENTS

| | | | |
|---|---|---|---|
| 1,771,257 | A | 7/1930 | Ingram |
| 1,772,196 | A | 8/1930 | Wallace |
| 1,806,927 | A | 5/1931 | Benjamin |
| 1,810,693 | A | 6/1931 | Alfaro |
| 1,829,616 | A | 10/1931 | Stalker |
| 1,845,307 | A | 2/1932 | Maxwell |
| 1,861,336 | A | 5/1932 | Cox |
| 1,888,871 | A | 11/1932 | Apperman |
| 1,993,419 | A | 3/1935 | Stalker |
| 2,039,676 | A | 5/1936 | Zaparka |
| 2,041,795 | A | 5/1936 | Stalker |
| 2,063,030 | A | 12/1936 | Goodman Crouch |
| 2,071,744 | A | 2/1937 | Anathor-Henrikson |
| 2,075,817 | A | 4/1937 | Loerke |
| 2,077,071 | A | 4/1937 | Rose |
| 2,078,854 | A | 4/1937 | Jones |
| 2,082,674 | A | 6/1937 | Young |
| 2,219,234 | A | 10/1940 | Messerschmitt |
| 2,223,744 | A | 12/1940 | Stalker |
| 2,225,525 | A | 12/1940 | Pitcairn |
| 2,267,927 | A | 12/1941 | Kightlinger |
| 2,352,144 | A | 6/1944 | Woods |
| 2,377,386 | A | 6/1945 | Stalker |
| 2,406,918 | A | 9/1946 | Stalker |
| 2,421,694 | A | 6/1947 | Hawkins |
| 2,427,972 | A | 9/1947 | Melchior |
| 2,438,942 | A | 4/1948 | Polk |
| 2,464,726 | A | 3/1949 | Stalker |
| 2,469,902 | A | 5/1949 | Stalker |
| 2,478,793 | A | 8/1949 | Trey |
| 2,507,611 | A | 5/1950 | Pappas |
| 2,511,504 | A | 6/1950 | Hawkins |
| 2,514,513 | A | 7/1950 | Price |
| 2,584,666 | A | 2/1952 | Bockrath |
| 2,585,676 | A | 2/1952 | Poisson-Quinton |
| 2,597,769 | A | 5/1952 | Ashkenas |
| 2,605,983 | A | 8/1952 | Stalker |
| 2,619,302 | A | 11/1952 | Loedding |
| 2,714,495 | A | 8/1955 | Focke |
| 2,734,701 | A | 2/1956 | William |
| 2,809,793 | A | 10/1957 | Warner |
| 2,841,344 | A | 7/1958 | Stroukoff |
| 2,873,931 | A | 2/1959 | Fleischmann |
| 2,892,582 | A | 6/1959 | O'Rourke |
| 2,910,254 | A | 10/1959 | Razak |
| 2,941,751 | A | 6/1960 | Gagarin |
| 2,946,541 | A | 7/1960 | Boyd |
| 2,961,192 | A | 11/1960 | Davidson et al. |
| 3,011,762 | A | 12/1961 | Pouit |
| 3,029,043 | A | 4/1962 | Churchill |
| 3,029,044 | A | 4/1962 | Childress |
| 3,039,719 | A | 6/1962 | Platt |
| 3,045,947 | A | 7/1962 | Bertin |
| 3,055,614 | A | 9/1962 | Thompson |
| 3,085,740 | A | 4/1963 | Wagner |
| 3,097,817 | A | 7/1963 | Towzey, Jr. |
| 3,101,678 | A | 8/1963 | Grube |
| 3,128,037 | A | 4/1964 | McClellan |
| 3,128,063 | A | 4/1964 | Kaplan |
| 3,128,364 | A | 4/1964 | Wanttaja |
| 3,144,220 | A | 8/1964 | Kittelson |
| 3,161,377 | A | 12/1964 | Balluff |
| 3,191,820 | A | 6/1965 | Kuster |
| 3,193,215 | A | 7/1965 | Dunham |
| 3,251,319 | A | 5/1966 | Kaupert |
| 3,261,576 | A | 7/1966 | Valyi |
| 3,262,658 | A | 7/1966 | Reilly |
| 3,291,420 | A | 12/1966 | Laing |
| 3,298,636 | A | 1/1967 | Arnholdt |
| 3,302,903 | A | 2/1967 | Vogel |
| 3,430,894 | A | 3/1969 | Torstein |
| 3,438,599 | A | 4/1969 | Welzen |
| 3,441,236 | A | 4/1969 | Eric |
| 3,478,987 | A | 11/1969 | Dorand Pierre |
| 3,506,220 | A | 4/1970 | Anthony |
| 3,507,463 | A | 4/1970 | Kuntz |
| 3,525,486 | A | 8/1970 | Wimpenny |
| 3,540,681 | A | 11/1970 | Paolo |
| 3,545,701 | A | 12/1970 | Bertin |
| 3,572,612 | A | 3/1971 | Irbitis |
| 3,576,300 | A | 4/1971 | Palfreyman |
| 3,586,267 | A | 6/1971 | Ingelman-Sundberg |
| 3,658,279 | A | 4/1972 | Robertson |
| 3,666,209 | A | 5/1972 | Taylor |
| 3,726,084 | A | 4/1973 | Meier |
| 3,807,663 | A | 4/1974 | Bartoe |
| 3,887,146 | A | 6/1975 | Bright |
| 3,917,193 | A | 11/1975 | Runnels, Jr. |
| 3,977,629 | A | 8/1976 | Tubeuf |
| 4,033,526 | A | 7/1977 | Benson |
| 4,086,022 | A | 4/1978 | Freeman |
| 4,117,995 | A | 10/1978 | Runge |
| 4,169,567 | A | 10/1979 | Tamura |
| 4,214,722 | A | 7/1980 | Tamura |
| 4,258,889 | A | 3/1981 | Hunt |
| 4,285,482 | A | 8/1981 | Lewis |
| 4,375,937 | A | 3/1983 | Cooper |
| 4,375,938 | A | 3/1983 | Dussourd |
| 4,381,091 | A | 4/1983 | Pegram |
| 4,391,424 | A | 7/1983 | Bartoe, Jr. |
| 4,398,683 | A | 8/1983 | Schmetzer |
| 4,398,688 | A | 8/1983 | Williams |
| 4,519,563 | A | 5/1985 | Tamura |
| 4,710,101 | A | 12/1987 | Jamieson |
| 4,771,602 | A | 9/1988 | Ruiz |
| 4,804,155 | A | 2/1989 | Strumbos |
| 4,813,631 | A | 3/1989 | Gratzer |
| 4,828,203 | A | 5/1989 | Clifton |
| 4,848,701 | A | 7/1989 | Belloso |
| 4,928,907 | A | 5/1990 | Zuck |
| 4,976,349 | A | 12/1990 | Adkins |
| 4,990,053 | A | 2/1991 | Rohne |
| 5,016,837 | A | 5/1991 | Willis |
| 5,098,034 | A | 3/1992 | Lendriet |
| 5,255,881 | A | 10/1993 | Rao |
| 5,280,863 | A | 1/1994 | Schmittle |
| 5,282,718 | A | 2/1994 | Koff |
| 5,289,848 | A | 3/1994 | Jenisch, Jr. |
| 5,308,225 | A | 5/1994 | Koff |
| 5,335,885 | A | 8/1994 | Bohning |
| 5,395,073 | A | 3/1995 | Rutan |
| 5,474,417 | A | 12/1995 | Privett |
| 5,542,149 | A | 8/1996 | Yu |
| 5,586,859 | A | 12/1996 | Nolcheff |
| 5,607,284 | A | 3/1997 | Byrne |
| 5,687,934 | A | 11/1997 | Owens |
| 5,687,937 | A | 11/1997 | Habib |
| 5,707,206 | A | 1/1998 | Goto |
| 5,765,777 | A | 6/1998 | Schmittle |
| 5,769,359 | A | 6/1998 | Rutan |
| 5,899,416 | A | 5/1999 | Meister |
| 6,068,446 | A | 5/2000 | Tangler et al. |
| 6,089,503 | A | 7/2000 | Volk |
| 6,119,987 | A | 9/2000 | Kiknadze |
| 6,220,012 | B1 | 4/2001 | Hauser |
| 6,231,301 | B1 | 5/2001 | Barnett |

(56) References Cited

U.S. PATENT DOCUMENTS 6,264,425 B1 7/2001 Keller
6,368,059 B1 4/2002 Maines
6,464,171 B2 10/2002 Ruffin
6,543,720 B2 4/2003 Ladd
6,585,479 B2 7/2003 Torrance
6,669,142 B2 12/2003 Saiz
6,796,533 B2 9/2004 Barrett
6,896,221 B1 5/2005 Einarsson
6,923,403 B1 8/2005 Dizdarevic
6,935,833 B2 8/2005 Seitz
7,074,006 B1 7/2006 Hathaway
7,104,143 B1 9/2006 Powell
7,143,983 B2 12/2006 McClure
7,308,762 B2 12/2007 Bath
7,354,247 B2 4/2008 Bonnet
7,435,057 B2 10/2008 Parera
7,441,724 B2 10/2008 Parks
7,520,465 B2 4/2009 Mahjoub
7,575,412 B2 8/2009 Seitz
7,673,832 B2 3/2010 Meister
7,837,438 B2 11/2010 Campbell
7,878,458 B2 2/2011 Shmilovich
8,128,037 B2 3/2012 Powell
8,128,364 B2 3/2012 Pesetsky
8,191,820 B1 6/2012 Westra
8,245,976 B2 8/2012 Sakurai
8,246,311 B2 8/2012 Pesetsky
8,251,317 B2 8/2012 Pitt
8,251,319 B2 8/2012 Jonker
8,262,031 B2 9/2012 Zha
8,302,903 B2 11/2012 Morgan
8,444,383 B1 5/2013 Baker
8,448,892 B2 5/2013 Zhu
8,459,597 B2 6/2013 Cloft
8,469,907 B2 6/2013 Ichihashi
8,485,476 B2 7/2013 Zha
8,561,935 B2 10/2013 Milde, Jr.
8,807,940 B2 8/2014 Grabau
8,829,706 B1 9/2014 Sammy
8,932,024 B2 1/2015 Hayashi
9,115,594 B2 8/2015 Krautheim
9,133,819 B2 9/2015 Zuteck
9,205,912 B2 12/2015 Clark
9,611,865 B2 4/2017 Morel
9,726,084 B2 8/2017 Duong
9,815,545 B1 11/2017 Steer
9,822,792 B2 11/2017 Guemmer
9,862,480 B2 1/2018 Brakes
10,106,246 B2 10/2018 Zha
10,252,789 B2 4/2019 Zha
10,315,754 B2 6/2019 Zha
10,371,121 B1 8/2019 Alhussan
10,683,076 B2 6/2020 Zha
10,683,077 B2 6/2020 Zha
10,724,435 B2 7/2020 Kroger
10,815,886 B2 10/2020 Kroger
11,034,430 B2 6/2021 Zha
2002/0139894 A1 10/2002 Sorensen
2002/0195526 A1 12/2002 Barrett
2003/0035715 A1 2/2003 Torrance
2003/0150962 A1 8/2003 Orban
2004/0003471 A1 1/2004 VanSteenburg
2005/0111968 A1 5/2005 Lapworth
2005/0152775 A1 7/2005 Japikse
2005/0226717 A1 10/2005 Xu
2006/0102801 A1 5/2006 Manley
2006/0196633 A1 9/2006 Mahjoub
2006/0219847 A1* 10/2006 Miller .................... B64C 23/00 244/130
2007/0095970 A1 5/2007 Richardson
2007/0196204 A1 8/2007 Seitz
2007/0217902 A1 9/2007 Sirakov
2007/0221788 A1 9/2007 Meister
2007/0228222 A1 10/2007 Davis
2008/0044273 A1 2/2008 Khalid
2009/0014592 A1 1/2009 Zha
2009/0065631 A1 3/2009 Zha
2009/0095446 A1 4/2009 Hamstra
2009/0108141 A1 4/2009 Shmilovich
2009/0169394 A1* 7/2009 Crow .................. B23K 26/389 219/69.17
2009/0173834 A1 7/2009 Prince
2009/0263234 A1 10/2009 Yin
2010/0104436 A1 4/2010 Herr
2010/0127129 A1 5/2010 Zha
2010/0135795 A1 6/2010 Nies
2010/0143121 A1 6/2010 Haans
2010/0143122 A1 6/2010 Nies
2010/0303634 A1* 12/2010 Long .................... F04D 29/324 114/140
2011/0001000 A1 1/2011 Zhu
2011/0001020 A1 1/2011 Forgac
2011/0044796 A1 2/2011 Hussain
2011/0103950 A1 5/2011 Pesetsky
2011/0103952 A1 5/2011 Pesetsky
2011/0103953 A1 5/2011 Haans
2011/0103963 A1 5/2011 Bendel et al.
2011/0142638 A1 6/2011 McGrath
2011/0206506 A1 8/2011 Nies
2011/0206507 A1 8/2011 Bhaisora et al.
2011/0206531 A1 8/2011 Kroo
2011/0210211 A1 9/2011 Zha
2011/0215172 A1 9/2011 Todorovic
2011/0229322 A1 9/2011 Tadayon
2011/0229329 A1 9/2011 Occhipinti
2012/0043428 A1 2/2012 Goelling
2012/0068020 A1 3/2012 Milde, Jr.
2012/0074264 A1 3/2012 Heaton
2012/0082562 A1 4/2012 Kotler
2012/0145834 A1 6/2012 Morgan
2012/0237341 A1 9/2012 Simon
2012/0301296 A1 11/2012 Greenblatt
2013/0206920 A1 8/2013 Bichler
2013/0266436 A1 10/2013 Ibaraki
2014/0286746 A1 9/2014 Nichols
2014/0286787 A1 9/2014 Philpsen
2014/0369812 A1 12/2014 Caruel
2016/0009374 A1 1/2016 Glezer
2016/0010652 A1 1/2016 Lim
2016/0040654 A1 2/2016 Cuoghi et al.
2016/0368339 A1 12/2016 Nam
2017/0033451 A1 2/2017 Lim
2017/0137116 A1 5/2017 Ireland
2017/0159667 A1 6/2017 Streit
2017/0211545 A1 7/2017 Saddoughi
2017/0355450 A1 12/2017 Zha
2017/0355451 A1 12/2017 Zha
2018/0251211 A1 9/2018 Zha
2018/0363676 A1 12/2018 Kroger
2018/0363677 A1 12/2018 Kroger
2019/0127042 A1 5/2019 Zha
2019/0389588 A1 12/2019 Zha

FOREIGN PATENT DOCUMENTS

CN 104149967 B 5/2015
CN 111734577 A 10/2020
DE 10328540 2/2008
DE 202011051844 U1 11/2011
EP 2320076 A2 5/2011
EP 2333317 A2 6/2011
EP 2469076 A2 6/2012
EP 3254961 A1 12/2017
EP 3498596 6/2019
GB 2564884 A 1/2019
JP 2013137006 7/2013
KR 20140029849 A 3/2014
WO 2007035758 A1 3/2007

(56) References Cited

FOREIGN PATENT DOCUMENTS

| | | | |
|---|---|---|---|
| WO | 2018095496 | A1 | 5/2018 |
| WO | 2020165663 | A1 | 8/2020 |

OTHER PUBLICATIONS

Espacenet, Patent Translate of DE202011051844, pp. 1-9, retrieved from Internet Apr. 11, 2018.
European Communication pursuant to Article 94(3) EPC, Application No. 18202156.8, dated Mar. 31, 2021. 6 pages.
European Patent Office, "Extended European Search Report" for EP application No. 18202156.8 dated Apr. 2, 2019, pp. 1-11.
European Patent Office, Extended European Search Report for Application No. 17175582.0, dated Nov. 9, 2017, pp. 1-5.
European Patent Office. "Extended European Search Report" for EP application No. 19181825.1, dated Oct. 30, 2019, pp. 1-7.
World Intellectual Property Organization, English Translation of CN 104149967, retrieved from Internet Oct. 4, 2019, pp. 1-4.
World Intellectual Property Organization, English Translation of CN 104176241, retrieved from Internet Oct. 2, 2019, pp. 1-7.
European Communication pursuant to Article 94(3) EPC, Application No. 18202156.8, dated Apr. 14, 2022.
International Search Report and Written Opinion, Application No. PCT/IB2020/050373, dated May 6, 2020.
International Search Report and Written Opinion, Application No. PCT/US2022/021540, dated Jun. 24, 2022.
PCT International Search Report and Written Opinion issued in Application No. PCT/US21/35115, dated Sep. 9, 2021, 19 pages.
Boeing, "About the Boeing 737 MAX" Online. Apr. 1, 2015; [retrieved on Sep. 14, 2022]; retrieved from the Internet URL: https://www.boeing.com/commercial/737max/.
Johnston, "Wing Flaps: How Do They Function and What Is Their Purpose?" Online. Aug. 16, 2019; [retrieved on Sep. 14, 2022], Retrieved from the Internet URL: https://calaero.edu/wing-glaps-function-and-purpose/#:-:text=Wing%20flaps%20change%20the%20shape,drag%20(used%20landing.
International Search Report and Written Opinion, Application No. PCT/US22/35707, dated Oct. 13, 2022.
USPTO, Non-Final Office Action, U.S. Appl. No. 17/702,351, dated Jul. 17, 2023.
Antcliff et al., "Baseline Assumptions and Future Research Areas for Urban Air Mobility Vehicles", AIAA SciTech Forum,(2019), pp. 1-18.
USPTO, Non-Final Office Action, U.S. Appl. No. 17/854,499, dated Oct. 4, 2023.
PCT International Preliminary Report on Patentability, Application No. PCT/US2022/021540, dated Oct. 5, 2023.
Great Britain Patent Act 1977: Examination Report under Section 18(3), Application No. GB2200772.8, dated Jul. 27, 2023.
PCT International Preliminary Report on Patentability, Application No. PCT/US2020/043022, dated Sep. 29, 2020.
Great Britain Patents Act 1977: Examination Report under Section 18(3), Application No. GB2200772.8, dated Oct. 27, 2023.
European Communication pursuant to Article 94(3), Application No. 18202156.8, dated Nov. 16, 2023.
Ren, "Simulation of 3D Co-Flow Jet Airfoil with Embedded Micro-Compressor Actuator", AIAA SciTech Forum, (2018), pp. 1-17, retrieved from the internet, URL: https://acfdlab.miami.edu/publications/aiaa-2018-0330.pdf.
Zha, "Super-Lift and Thrusting Airfoil of Coflow Jet Actuated by Micro-Compressors", AIAA AVIATION Forum, (2018), pp. 1-17, retrieved from the internet, URL: https://acfdlab.miami.edu/publications/aiaa-paper-2018-3061.pdf.
European Communication pursuant to Rule 114(2), Third Party Observation for Application No. EP20180202156, dated Nov. 13, 2023.

* cited by examiner

FLUID SYSTEMS AND METHODS THAT ADDRESS FLOW SEPARATION

FIELD

The disclosure relates generally to the field of fluid systems. More particularly, the disclosure relates to fluid systems and methods that address flow separation.

BACKGROUND

In general, flow separation occurs when the local geometry is altered and can occur in both internal and external flows. Flow separation creates a local adverse pressure gradient such that the pressure increases in the flow direction. In some cases, flow separation generates a recirculating flow, or vorticial flow, resulting in high energy loss and undesirable flow characteristics. For example, the creation of flow separation in the inlet of an aircraft engine results in inlet distortion, which can damage the engine downstream.

A need exists, therefore, for new and useful fluid systems and methods that address flow separation.

SUMMARY OF SELECTED EXAMPLE EMBODIMENTS

Various examples of fluid systems that address flow separation are described herein.

An example fluid system for addressing flow separation that has a first end and a second end comprises a main body and a fluid pressurizer. The main body has a first end, a second end, a first portion, a second portion, an injection opening, a suction opening, a channel that extends from the suction opening to the injection opening, and a side wall. The first portion is disposed between the first end of the main body and the second end of the main body. The second portion extends from the first portion toward the second end of the main body. The first portion has a first axis that extends along the side wall. The second portion has a second axis that extends along the side wall at an angle relative to the first axis such that when fluid flows over the main body flow separation is defined adjacent to the second portion. The injection opening is disposed between the first end of the main body and the second end of the main body and at a first location relative to the flow separation. The suction opening is disposed between the injection opening and the second end of the main body and at a second location relative to the flow separation. The channel extends from the suction opening to the injection opening. The fluid pressurizer is disposed within the channel and is moveable between on and off states such that fluid flows into the suction opening and out of the injection opening when the fluid pressurizer is in the on state.

Another example fluid system for addressing flow separation that has a first end and a second end comprises a main body and a fluid pressurizer. The main body has a first end, a second end, a first portion, a second portion, an injection opening, a suction opening, a channel that extends from the suction opening to the injection opening, a side wall, a first opening at the first end, a second opening at the second end, and a passageway that extends from the first opening to the second opening. The first portion is disposed between the first end of the main body and the second end of the main body. The second portion extends from the first portion toward the second end of the main body. The first portion has a first axis that extends along the side wall. The second portion has a second axis that extends along the side wall at an angle relative to the first axis such that when fluid flows over the main body flow separation is defined adjacent to the second portion. The injection opening is disposed between the first opening and the second opening and at a first location relative to the flow separation. The suction opening is disposed between the injection opening and the second opening and at a second location relative to the flow separation. The channel extends from the suction opening to the injection opening. The fluid pressurizer is disposed within the channel and is moveable between on and off states such that fluid flows into the suction opening and out of the injection opening when the fluid pressurizer is in the on state.

An example method of incorporating a fluid system into an object to address flow separation comprises determining whether flow separation is created by the object when the object is subjected to fluid flow; if flow separation is created, determining the location of flow separation relative to the object; incorporating an injection opening into the object at a first location relative to the flow separation; incorporating a suction opening into the object at a second location relative to the flow separation; incorporating a channel into the object that extends from the suction opening to the injection opening; and positioning a fluid pressurizer in the channel.

Additional understanding of the exemplary fluid systems and methods that address flow separation can be obtained by review of the detailed description, below, and the appended drawings.

DETAILED DESCRIPTION

The following detailed description and the appended drawings describe and illustrate various example embodiments of fluid systems and methods that address flow separation. The description and illustration of these examples are provided to enable one skilled in the art to make and use a fluid system that addresses flow separation. They are not intended to limit the scope of the claims in any manner.

As used herein, the term “radius” refers to the length of a straight line passing from the center of a body, element, or feature to a surface of the body, element, or feature, and does not impart any structural configuration on the body, element, or feature.

As used herein, the term “diameter” refers to the length of a straight line passing through the center of a body, element, or feature from one surface of the body, element, or feature, to another surface of the body, element, or feature and does not impart any structural configuration on the body, element, or feature.

Figure 1:
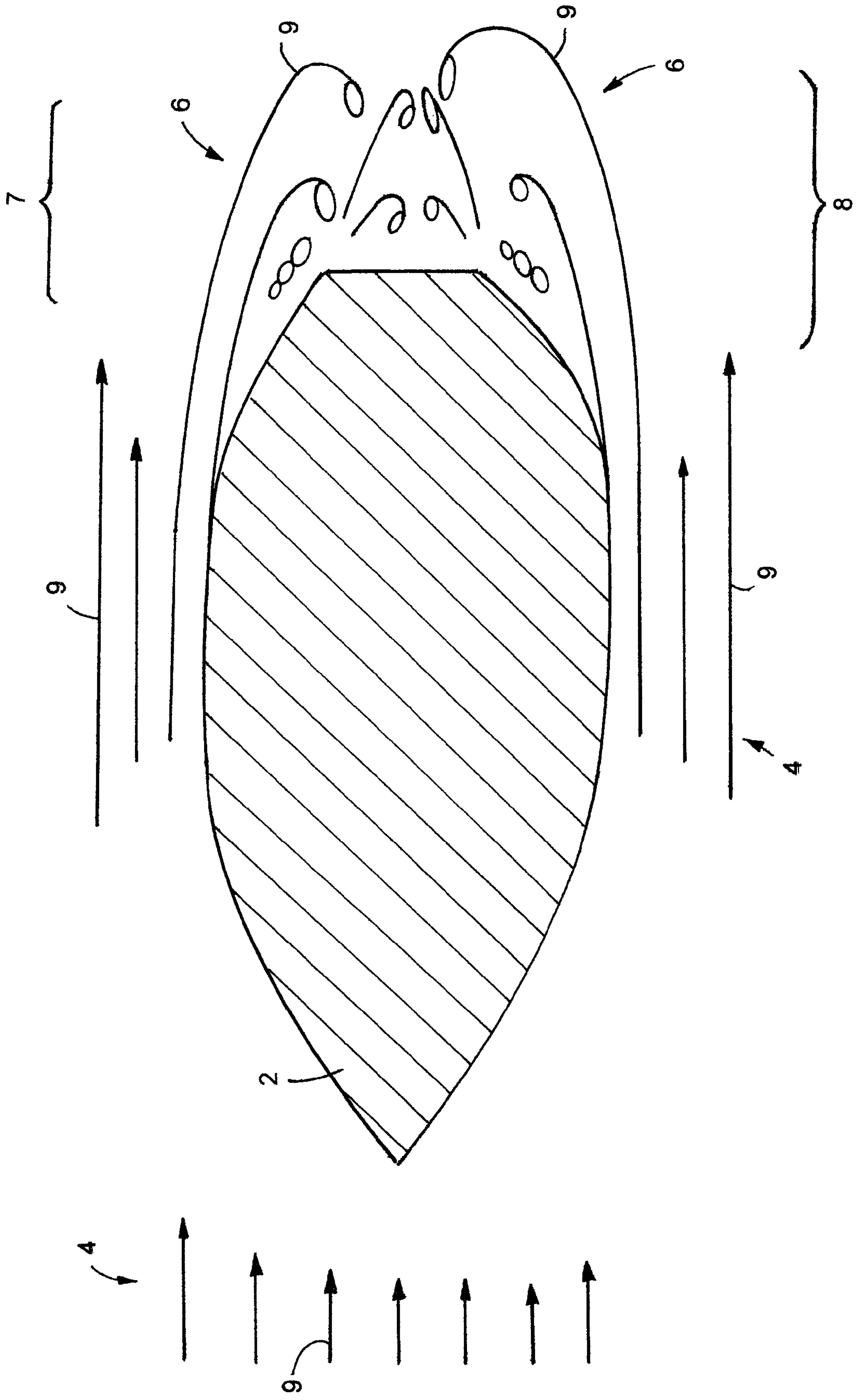
FIG. 1 is a cross-sectional view of a main body taken along the lengthwise axis of the main body and subjected to a fluid flow field.

FIG. 1 illustrates a main body 2 subjected to a fluid flow field 4. As shown in FIG. 1, flow separation 6 occurs at a first location 7 and a second location 8 relative to the main body 2 as fluid 9 flows over the main body 2, which results in high energy loss and undesirable flow characteristics around the main body 2.

Figure 2:
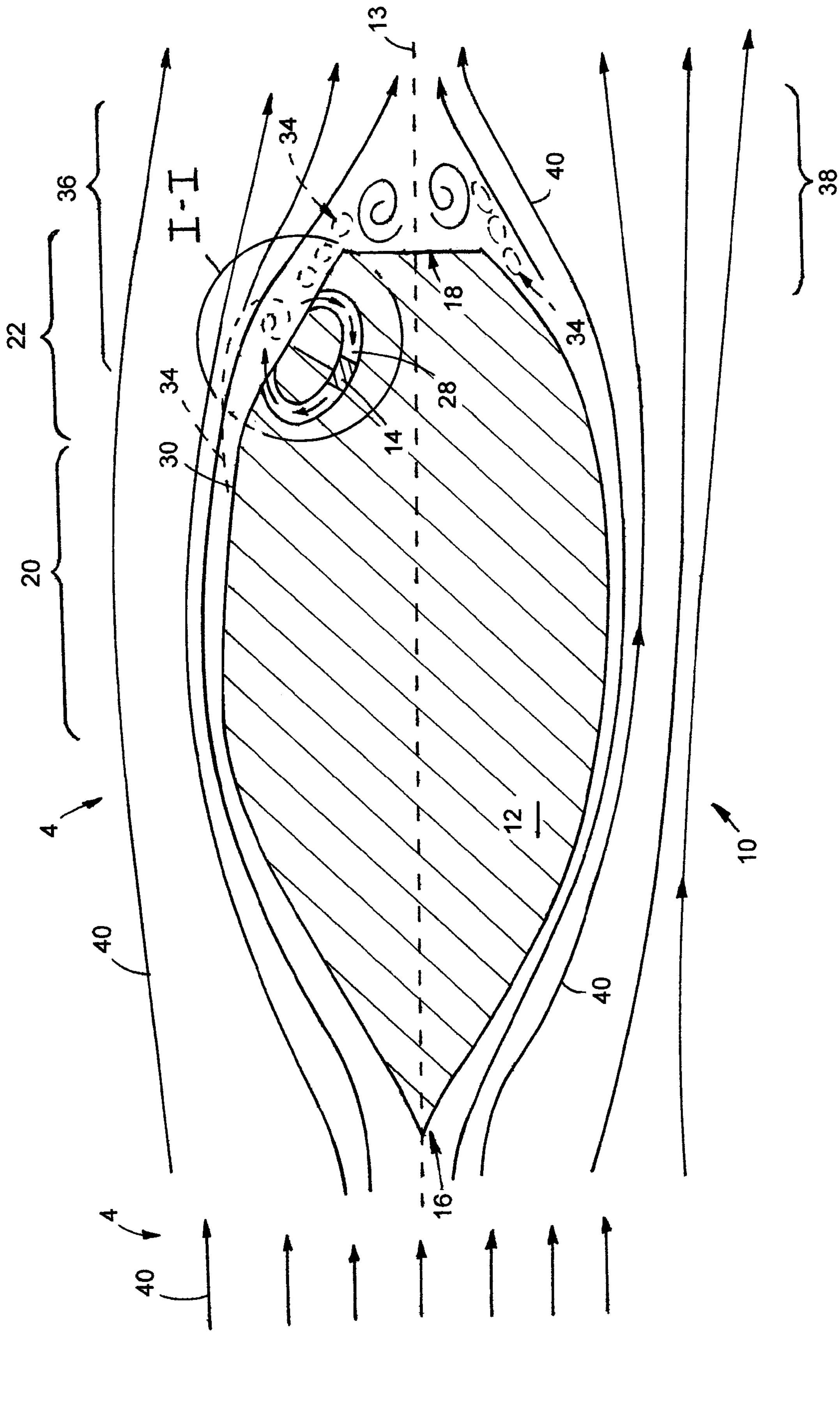
FIG. 2 is a cross-sectional view of an example fluid system that addresses flow separation taken along the lengthwise axis of the main body and subjected to a fluid flow field. The fluid pressurizer is in an on state and the solid fluid lines illustrate no flow separation. The phantom fluid lines illustrate flow separation when the fluid pressurizer is in the off state.
Figure 3:
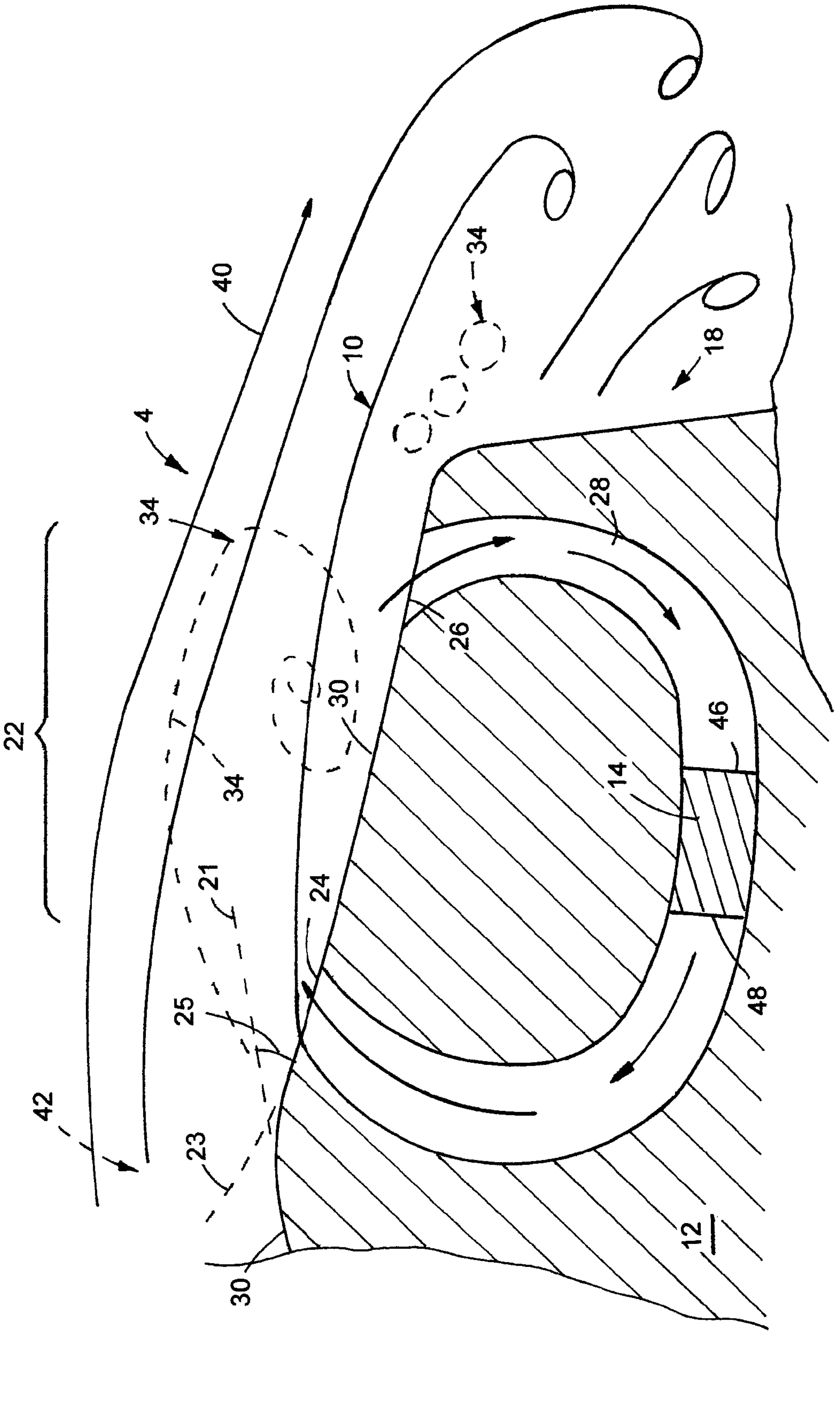
FIG. 3 is a magnified view of area I-I illustrated FIG. 2.

FIGS. 2 and 3 illustrate a first example fluid system 10 for addressing flow separation that is subjected to a fluid flow field 4. The fluid system 10 has a main body 12 and a fluid pressurizer 14. The main body 12 has a lengthwise axis 13, a first end 16, a second end 18, a first portion 20, a second portion 22, an injection opening 24, a suction opening 26, a channel 28 that extends from the suction opening 26 to the injection opening 24, and a side wall 30. The first portion 20 is disposed between the first and second ends 16, 18 and has a first axis 21 that extends along a portion of the side wall 30. The second portion 22 extends from the first portion 20 toward the second end 18 and has a second axis 23 that extends along a portion of the side wall 30. The first portion 20 has a first cross-sectional shape taken along a plane that contains the lengthwise axis 13 and the second portion 22 has a second cross-sectional shape that is different than the first portion 20 and taken along a plane that contains the lengthwise axis 13. In the illustrated embodiment, the side wall 30 along the first portion 20 is substantially straight, the first axis 21 is substantially parallel to the lengthwise axis 13, the side wall 30 along the second portion is substantially straight, and the second axis 23 is disposed at an angle 25 relative to the first axis 21. In the illustrated embodiment, the angle 25 is about 35 degrees such that the second portion 22 extends toward the lengthwise axis 13 of the main body 12 from the first portion 20 toward the second end 18. While angle 25 has been illustrated as being about 35 degrees, a main body can have any suitable structural configuration such that an angle can be equal to, greater than, less than, or about 25 degrees, 35 degrees, 45 degrees, between about 0 degrees and about 180 degrees, between about 1 degree and about 179 degrees, between about 1 degree and about 90 degrees and any other angle considered suitable for a particular embodiment. A main body can have any suitable structural arrangement, including those that have side walls that are entirely, or partially, substantially straight, curved, or otherwise configured relative to a lengthwise axis.

In the illustrated embodiment, flow separation 34, illustrated in phantom lines, occurs at a first location 36 and a second location 38 relative to the main body 12 as fluid 40 flows over the main body 12 and the fluid pressurizer is in an off state, as described in more detail herein. The first location 36 of flow separation 34 is disposed adjacent the second portion 22 and has a first end 42, which is positioned at a location at which the flow separation 34 begins (e.g., the boundary layer becomes separated from the main body 12). When the fluid pressurizer 14 is in the on state, as described in more detail herein, flow separation is removed, or reduced, as shown in solid lines.

The injection opening 24 is disposed between the first end 16 and the second end 18 and the suction opening 26 is disposed between the injection opening 24 and the second end 18. The channel 28 extends from the suction opening 26 to the injection opening 24. In the illustrated embodiment, each of the injection opening 24 and the suction opening 26 is disposed on the second portion 22 of the main body 12. The injection opening 24 is disposed between the first end 42 of flow separation 34 and the suction opening 26 and the suction opening 26 is disposed between the first end 42 of flow separation 34 and the second end 18. However, alternative embodiments can include a suction opening that is disposed between the first and second ends of a main body and an injection opening that is disposed between the suction opening and the second end of the main body. In the embodiments described herein, the position fluid pressurizer can be rotated 180 degrees, the injection openings described herein can function as suction openings, and the suction openings described herein can function as injection openings.

The fluid pressurizer 14 is disposed within the channel 28 and is moveable between on and off states such that fluid flows into the suction opening 26 and out of the injection opening 24 when the fluid pressurizer 14 is in the on state. The fluid pressurizer 14 provides a mechanism for pressurizing the fluid 40 passing through the channel 28 during use. In the illustrated embodiment, the fluid pressurizer 14 is disposed a first distance from the suction opening 26 when traveling through the channel 28 from the suction opening 26 to the fluid pressurizer 14 and a second distance from the injection opening 24 when traveling through the channel 28 from the fluid pressurizer 14 to the injection opening 24. The first distance is equal to the second distance. However, alternative embodiments can include a fluid pressurizer in which the first distance is greater than, or equal to, the second distance. A fluid pressurizer included in a fluid system can comprise any suitable device, system, or component capable of pressurizing fluid and selection of a suitable fluid pressurizer can be based on various considerations, such as the structural arrangement of a channel within which a fluid pressurizer is intended to be disposed. Examples of fluid pressurizers considered suitable to include in a fluid system include electric pumps, pneumatic pumps, hydraulic pumps, micro-pumps, fans, compressors, micro-compressors, vacuums, blowers, and any other fluid pressurizer considered suitable for a particular embodiment. In the illustrated embodiment, the fluid pressurizer 14 is a micro-compressor.

In the illustrated embodiment, the fluid pressurizer 14 is disposed (e.g., entirely) within the channel 28, is moveable between an off state and an on state, and has a suction port 46 and a discharge port 48. It is considered advantageous to include a fluid pressurizer 14 in a channel 28 defined by a main body 12 at least because the inclusion of a fluid pressurizer 14 provides a mechanism for pressurizing fluid that passes through the channel 28 such that it forms a jet as the fluid exits the injection opening 24. This is considered advantageous at least because it provides a mechanism for reducing, or eliminating, flow separation 34. The fluid pressurizer 14 can be operatively connected to any suitable portion of a device, system, or component on which the fluid system 10 is disposed to provide power to the fluid pressurizer (e.g., battery, electric motor) and to provide a mechanism for moving the fluid pressurizer between the off state and the on state (e.g., one or more switches). Alternative embodiments can include a fluid pressurizer that can vary the degree to which fluid is pressurized through the channel 28.

The fluid pressurizer 14 is attached to the main body 12 and is positioned such that the suction port 46 is directed toward a first portion of the channel 28 that extends from the suction opening 26 to the fluid pressurizer 14 (e.g., the suction port 46 is directed toward the suction opening 26) and the discharge port 48 is directed toward a second portion of the channel 28 that extends from the injection opening 24 to the fluid pressurizer 14 (e.g., the discharge port 48 is directed toward the injection opening 24). In the off state, the fluid pressurizer 14 does not pressurize fluid passing through the channel 28. In the on state, the fluid pressurizer 14 draws fluid through the suction opening 26 downstream from the injection opening 24, through the fluid pressurizer 14, pressurizes the fluid, and pushes fluid out of the discharge port

48 and the injection opening 24. When in the on state, the fluid entering the channel 28 at the suction opening 26 has a first velocity and the fluid exiting the channel 28 at the injection opening 24 has a second velocity that is greater than the first velocity and is directed tangential to the main body 12. However, alternative embodiments can define an injection opening that directs fluid exiting the injection opening at any suitable angle relative to the main body (e.g., between about 0 degrees and about 180 degrees relative to a main body). In addition, the fluid entering the channel 28 at the suction opening 26 has a first total pressure and the fluid exiting the channel 28 at the injection opening 24 has a second total pressure that is greater than the first total pressure.

It is considered advantageous to include a channel and/or fluid pressurizer on a main body, as described herein, at least because a channel and/or fluid pressurizer (e.g., when in the on state) reduces, or removes, flow separation resulting in fluid flow that is more uniform, more energy efficient, reduces noise, and/or increases the life span of the downstream machinery (e.g., jet engine compressors and/or fans) relative to main bodies that do not include a channel and/or fluid pressurizer. As shown in FIGS. 2 and 3, when the fluid pressurizer 14 is in an off state flow separation 34, shown in phantom lines, occurs adjacent the main body 12 and when the fluid pressurizer 14 is in an on state flow separation is removed, or reduced, from adjacent the main body 12, shown in solid lines.

A fluid pressurizer can be attached to a main body 12 using any suitable technique or method of attachment and selection of a suitable technique or method of attachment between a fluid pressurizer and a main body can be based on various considerations, including the material(s) that forms the fluid pressurizer and/or the main body. Examples of techniques and methods of attachment considered suitable include welding, fusing, using adhesives, mechanical connectors, and any other technique or method considered suitable for a particular embodiment. In the illustrated embodiment, the fluid pressurizer 14 is attached to the main body 12 using mechanical connectors (e.g., screws, bolts).

While the main body 12 has been illustrated as having a particular structural configuration and as being formed as a single piece of material, a main body of a fluid system can have any suitable structural configuration and be formed of any suitable number of pieces of material. Selection of a suitable structural arrangement for a main body and number of pieces of material to form a main body of a fluid system can be based on various considerations, including the intended use of the fluid system. Examples of numbers of pieces of material considered suitable to form a main body include one, at least one, two, a plurality, three, four, five, more than five, multiple pieces of material, and any other number considered suitable for a particular embodiment. When formed of multiple pieces of material, each piece forming a main body can be attached to another piece of material forming a main body using any suitable technique or method of attachment.

Figure 4:
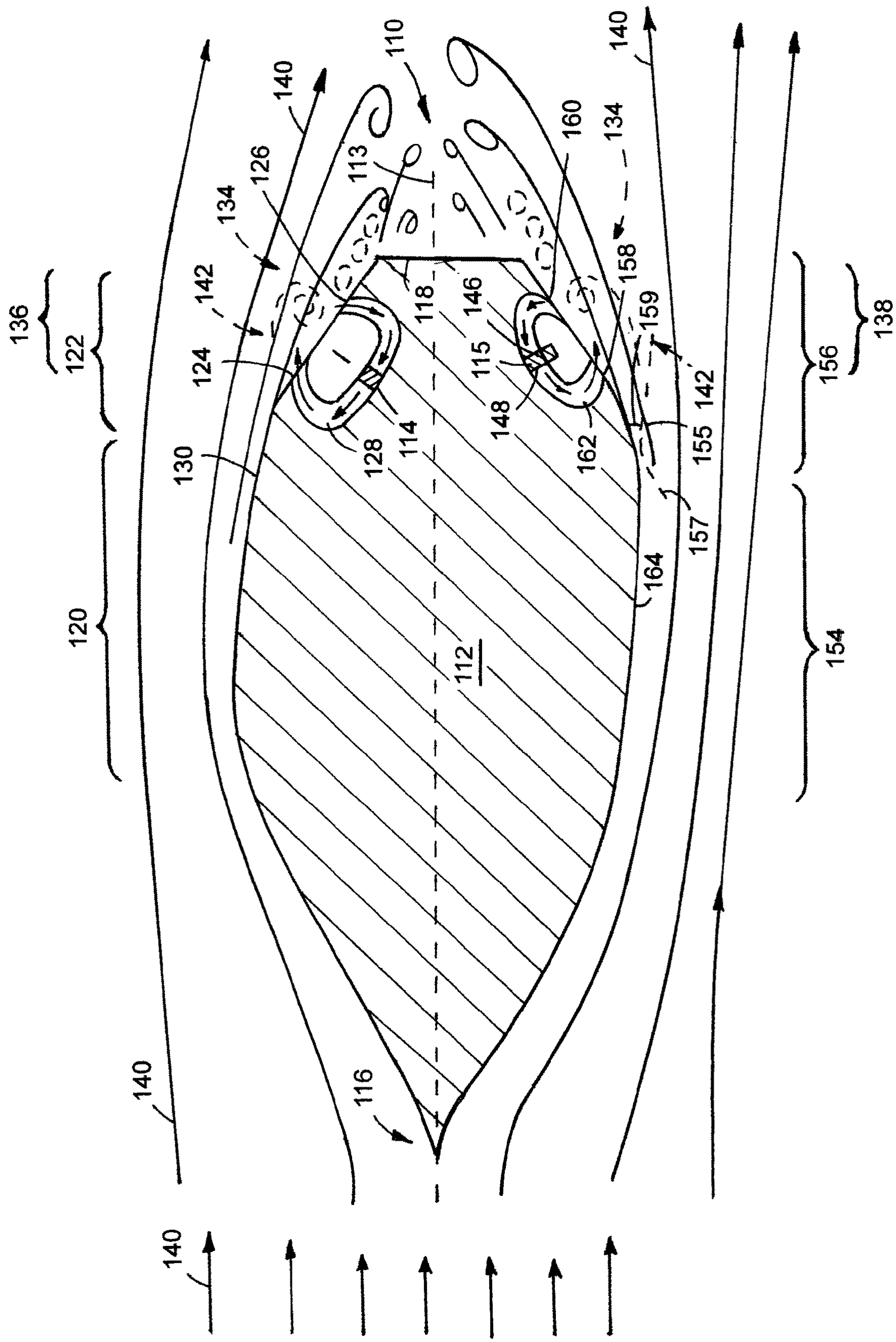
FIG. 4 is a cross-sectional view of another example fluid system that addresses flow separation taken along the lengthwise axis of the main body and subjected to a fluid flow field. The fluid pressurizers are in an on state and the solid fluid lines illustrate no flow separation. The phantom fluid lines illustrate flow separation when the fluid pressurizer is in the off state.

FIG. 4 illustrates another example fluid system 110. The fluid system 110 is similar to the fluid system 10 illustrated in FIGS. 2 and 3 and described above, except as detailed below. The fluid system 110 includes a main body 112, a first fluid pressurizer 114, and a second fluid pressurizer 115.

In the illustrated embodiment, the main body 112 has a lengthwise axis 113, a first end 116, a second end 118, a first portion 120, a second portion 122, a first injection opening 124, a first suction opening 126, a first channel 128 that extends from the first suction opening 126 to the first injection opening 124, a first side wall 130, a third portion 154, a fourth portion 156, a second injection opening 158, a second suction opening 160, a second channel 162 that extends from the second suction opening 160 to the second injection opening 158, and a second side wall 164.

In the illustrated embodiment, the third portion 154 is disposed between the first and second ends 116, 118 and has a third axis 155 that extends along a portion of the second side wall 164. The fourth portion 156 extends from the third portion 154 toward the second end 118 and has a fourth axis 157 that extends along a portion of the side wall 130. The third portion 154 and the first portion 120 have the same first cross-sectional shape taken along a plane that contains the lengthwise axis 113 and the fourth portion 156 and the second portion 122 have the same second cross-sectional shape that is different than the first cross-sectional shape and taken along a plane that contains the lengthwise axis 113. In the illustrated embodiment, the second side wall 164 along the third portion 154 is substantially straight, the third axis 155 is substantially parallel to the lengthwise axis 113, the second side wall 164 along the fourth portion 156 is substantially straight, and the fourth axis 157 is disposed at an angle 159 relative to the third axis 155. In the illustrated embodiment, the angle 159 is about 35 degrees such that the fourth portion 156 extends toward the lengthwise axis 113 of the main body 112 from the third portion 154 toward the second end 118.

In the illustrated embodiment, flow separation 134, illustrated in phantom lines, occurs at a first location 136 and a second location 138 relative to the main body 112 as fluid 140 flows over the main body 112 and the fluid pressurizers 114, 115 are in an off state. The first location 136 of flow separation 134 is disposed adjacent the second portion 122 and has a first end 142, which is positioned at a location at which the flow separation 134 begins (e.g., the boundary layer becomes separated from the main body 112). The second location 138 of flow separation 134 is disposed adjacent the fourth portion 156 and has a first end 142, which is positioned at a location at which the flow separation 134 begins (e.g., the boundary layer becomes separated from the main body 112). When the fluid pressurizers 114, 115 are in the on state flow separation is removed, or reduced, as shown in solid lines.

The second injection opening 158 is disposed between the first end 116 and the second end 118 and the second suction opening 160 is disposed between the second injection opening 158 and the second end 118. The second channel 162 extends from the second suction opening 160 to the second injection opening 158. In the illustrated embodiment, each of the second injection opening 158 and the second suction opening 160 is disposed on the fourth portion 156 of the main body 112. The second injection opening 158 is disposed between the third portion 154 of the main body 112 and the first end 142 of flow separation 134 and the second suction opening 160 is disposed between the first end 142 of flow separation 134 and the second end 118.

The second fluid pressurizer 115 is disposed within the second channel 162 and is moveable between on and off states such that fluid flows into the second suction opening 160 and out of the second injection opening 158 when the second fluid pressurizer 115 is in the on state. The second fluid pressurizer 115 provides a mechanism for pressurizing the fluid 140 passing through the second channel 162 during use. In the illustrated embodiment, the second fluid pressurizer 115 is disposed a first distance from the second suction opening 160 when traveling through the second channel 162 from the second suction opening 160 to the second fluid pressurizer 115 and a second distance from the second injection opening 158 when traveling through the second channel 162 from the second fluid pressurizer 115 to the second injection opening 158. The first distance is less than the second distance. In the illustrated embodiment, the second fluid pressurizer 115 is a micro-compressor.

In the illustrated embodiment, the second fluid pressurizer 115 is disposed (e.g., partially) within the second channel 162, is moveable between an off state and an on state, and has a suction port 146 and a discharge port 148. It is considered advantageous to include a second fluid pressurizer 115 in a second channel 162 defined by a main body 112 at least because the inclusion of a second fluid pressurizer 115 provides a mechanism for pressurizing fluid that passes through the second channel 162 such that it forms a jet as the fluid exits the second injection opening 158. This is considered advantageous at least because it provides a mechanism for reducing, or eliminating, flow separation 134.

The second fluid pressurizer 115 is attached to the main body 112 and is positioned such that the suction port 146 is directed toward a first portion of the second channel 162 that extends from the second suction opening 160 to the second fluid pressurizer 115 (e.g., the suction port 146 is directed toward the second suction opening 160) and the discharge port 148 is directed toward a second portion of the second channel 162 that extends from the second injection opening 158 to the second fluid pressurizer 115 (e.g., the discharge port 148 is directed toward the second injection opening 158). In the off state, the second fluid pressurizer 115 does not pressurize fluid passing through the second channel 162. In the on state, the second fluid pressurizer 115 draws fluid through the second suction opening 160, through the second fluid pressurizer 115, and pushes fluid out of the discharge port 148 and the second injection opening 158. When in the on state, the fluid entering the second channel 162 at the second suction opening 160 has a first velocity and the fluid exiting the second channel 162 at the second injection opening 158 has a second velocity that is greater than the first velocity and is directed tangential to the main body 112. In addition, the fluid entering the second channel 162 at the second suction opening 160 has a first total pressure and the fluid exiting the second channel 162 at the second injection opening 158 has a second total pressure that is greater than the first total pressure. As shown in FIG. 4, when the fluid pressurizers 114, 115 are in an off state flow separation 134, shown in phantom lines, occurs adjacent the main body 112 and when the fluid pressurizers 114, 115 are in an on state flow separation is removed, or reduced, from adjacent the main body 112, shown in solid lines.

Figure 5:
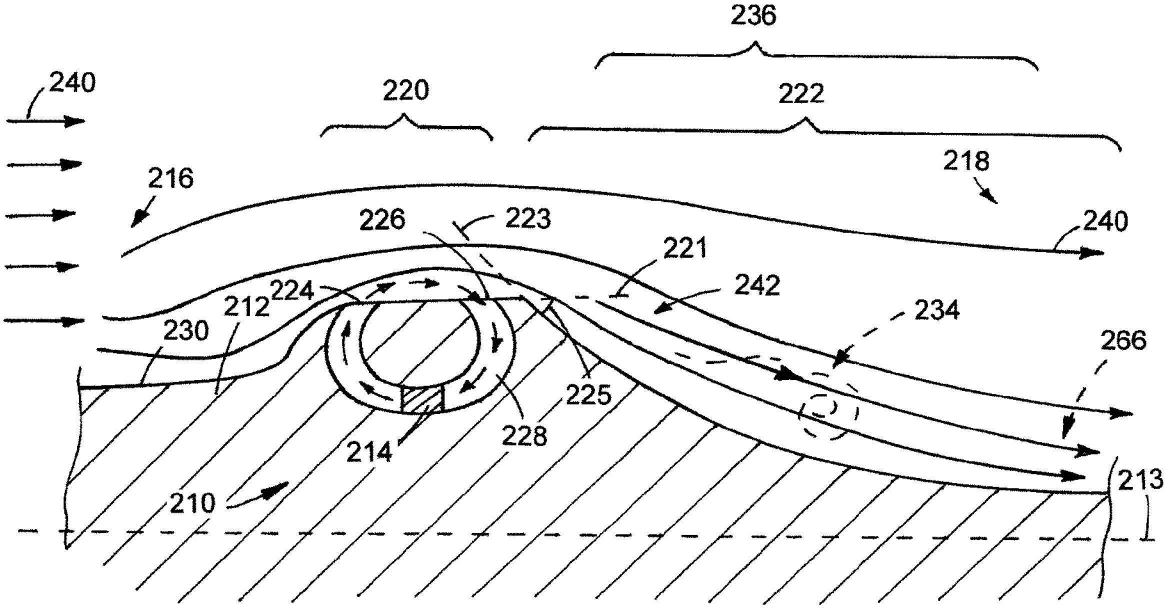
FIG. 5 is a partial cross-sectional view of another example fluid system that addresses flow separation taken along the lengthwise axis of the main body and subjected to a fluid flow field. The fluid pressurizer is in an on state and the solid fluid lines illustrate no flow separation. The phantom fluid lines illustrate flow separation when the fluid pressurizer is in the off state.

FIG. 5 illustrates another example fluid system 210. The fluid system 210 is similar to the fluid system 10 illustrated in FIGS. 2 and 3 and described above, except as detailed below. The fluid system 210 includes a main body 212 and a fluid pressurizer 214.

In the illustrated embodiment, the main body 212 has a lengthwise axis 213, a first end 216, a second end 218, a first portion 220, a second portion 222, an injection opening 224, a suction opening 226, a channel 228 that extends from the suction opening 226 to the injection opening 224, and a side wall 230. The first portion 220 is disposed between the first and second ends 216, 218 and has a first axis 221 that extends along a portion of the side wall 230. The second portion 222 extends from the first portion 220 toward the second end 218 and has a second axis 223 that extends along a portion of the side wall 230. In the illustrated embodiment, the side wall 230 along the first portion 220 is substantially straight, the first axis 221 is substantially parallel to the lengthwise axis 213, the side wall 230 along the second portion 222 is curved, and the second axis 223 is disposed at an angle 225 relative to the first axis 221. In the illustrated embodiment, the angle 225 is greater than 35 degrees such that a portion of the second portion 222 extends toward the lengthwise axis 213 of the main body 212 from the first portion 220 toward the second end 218.

In the illustrated embodiment, flow separation 234, illustrated in phantom lines, occurs at a location 236 relative to the main body 212 as fluid 240 flows over the main body 212 and the fluid pressurizer 214 is in an off state. The location 236 of flow separation 234 is disposed adjacent the second portion 222 and has a first end 242, which is positioned at a location at which the flow separation 234 begins (e.g., the boundary layer becomes separated from the main body 212), and a second end 266, which is positioned at a location at which the fluid flow 240 reattaches to the main body 212 (e.g., the boundary layer reattaches to the main body 212). When the fluid pressurizer 214 is in the on state, as shown, flow separation is removed, or reduced, as shown in solid lines.

The injection opening 224 is disposed between the first end 216 and the second end 218 and the suction opening 226 is disposed between the injection opening 224 and the second end 218. The channel 228 extends from the suction opening 226 to the injection opening 224. In the illustrated embodiment, each of the injection opening 224 and the suction opening 226 is disposed on the first portion 220 of the main body 212. The injection opening 224 is disposed between the first end 216 of the main body 212 and the first end 242 of flow separation 234 and the suction opening 226 is disposed between the injection opening 224 and the first end 242 of flow separation 234.

Figure 6:
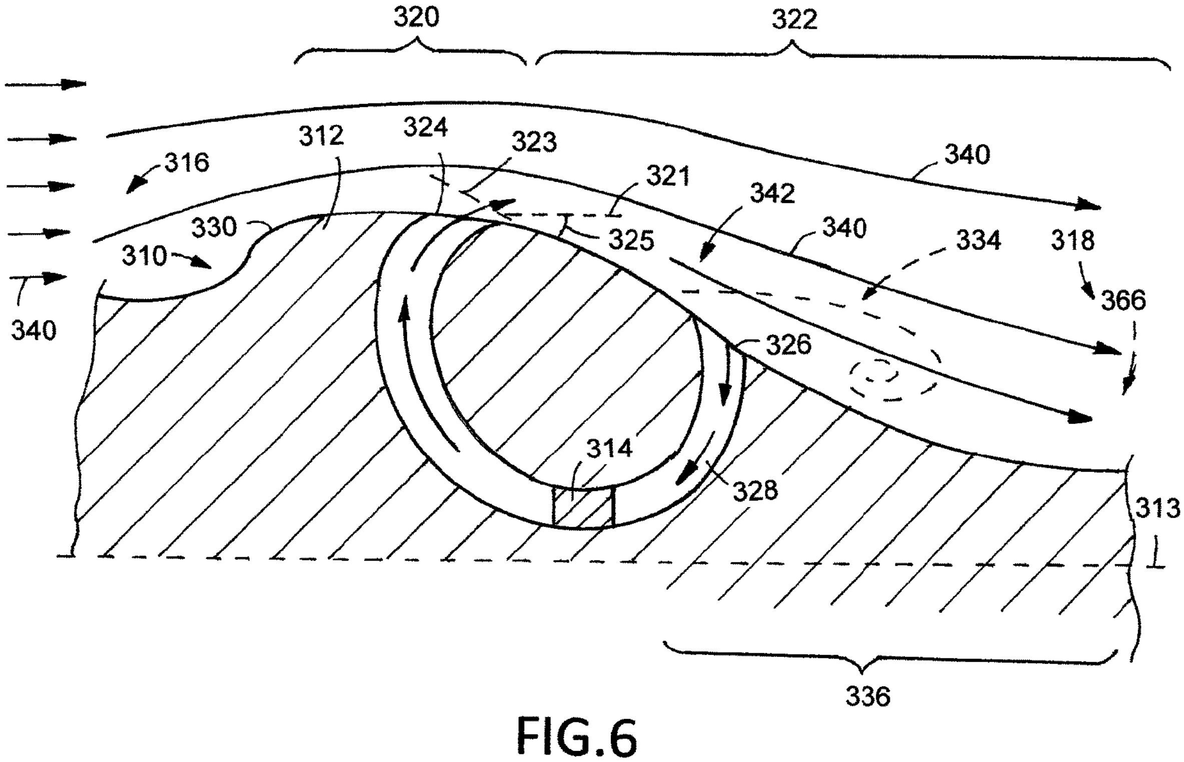
FIG. 6 is a partial cross-sectional view of another example fluid system that addresses flow separation taken along the lengthwise axis of the main body and subjected to a fluid flow field. The fluid pressurizer is in an on state and the solid fluid lines illustrate no flow separation. The phantom fluid lines illustrate flow separation when the fluid pressurizer is in the off state.

FIG. 6 illustrates another example fluid system 310. The fluid system 310 is similar to the fluid system 10 illustrated in FIGS. 2 and 3 and described above, except as detailed below. The fluid system 310 includes a main body 312 and a fluid pressurizer 314.

In the illustrated embodiment, the main body 312 has a lengthwise axis 313, a first end 316, a second end 318, a first portion 320, a second portion 322, an injection opening 324, a suction opening 326, a channel 328 that extends from the suction opening 326 to the injection opening 324, and a side wall 330. The first portion 320 is disposed between the first and second ends 316, 318 and has a first axis 321 that extends along a portion of the side wall 330. The second portion 322 extends from the first portion 320 toward the second end 318 and has a second axis 323 that extends along a portion of the side wall 330. In the illustrated embodiment, the side wall 330 along the first portion 320 is curved, the first axis 321 is disposed at an angle relative to the lengthwise axis 313 (e.g., extends toward the lengthwise axis 313), the side wall 330 along the second portion 322 is curved, and the second axis 323 is disposed at an angle 325 relative to the first axis 321. In the illustrated embodiment, the angle 325 is less than 35 degrees such that a portion of the second portion 322 extends toward the lengthwise axis 313 of the main body 312 from the first portion 320 toward the second end 318.

In the illustrated embodiment, flow separation 334, illustrated in phantom lines, occurs at a location 336 relative to the main body 312 as fluid 340 flows over the main body 312 and the fluid pressurizer 314 is in the off state. The location 336 of flow separation 334 is disposed adjacent the second portion 322 and has a first end 342, which is positioned at a location at which the flow separation 334 begins (e.g., the boundary layer becomes separated from the main body 312), and a second end 366, which is positioned at a location at which the fluid flow 340 reattaches to the main body 312 (e.g., the boundary layer reattaches to the main body 312). When the fluid pressurizer 314 is in the on state, as shown, flow separation is removed, or reduced, as shown in solid lines.

The injection opening 324 is disposed between the first end 316 and the second end 318 and the suction opening 326 is disposed between the injection opening 324 and the second end 318. The channel 328 extends from the suction opening 326 to the injection opening 324. In the illustrated embodiment, the injection opening 324 is disposed on the first portion 320 of the main body 312 and the suction opening 326 is disposed on the second portion 322 of the main body 312. The injection opening 324 is disposed between the first end 316 of the main body 312 and the first end 342 of flow separation 334 and the suction opening 326 is disposed at the first end 342 of flow separation 334.

Figure 7:
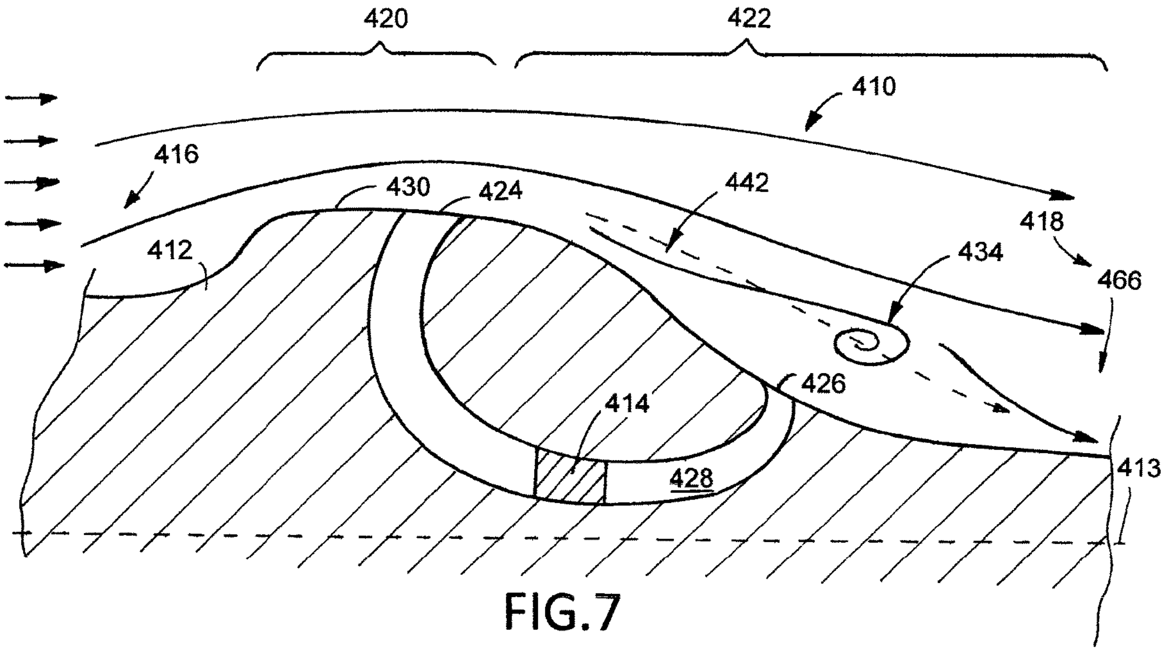
FIG. 7 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 7 illustrates another example fluid system 410. The fluid system 410 is similar to the fluid system 310 illustrated in FIG. 6 and described above, except as detailed below. The fluid system 410 includes a main body 412 and a fluid pressurizer 414.

In the illustrated embodiment, the main body 412 has a lengthwise axis 413, a first end 416, a second end 418, a first portion 420, a second portion 422, an injection opening 424, a suction opening 426, a channel 428 that extends from the suction opening 426 to the injection opening 424, and a side wall 430. The injection opening 424 is disposed on the first portion 420 of the main body 412 and the suction opening 426 is disposed on the second portion 422 of the main body 412. The injection opening 424 is disposed between the first end 416 of the main body 412 and the first end 442 of flow separation 434, illustrated in solid lines, and the suction opening 426 is disposed between the first end 442 of flow separation 434 and the second end 466 of flow separation 434. When the fluid pressurizer 414 is in the on state, flow separation is removed, or reduced, as shown in phantom lines.

Figure 8:
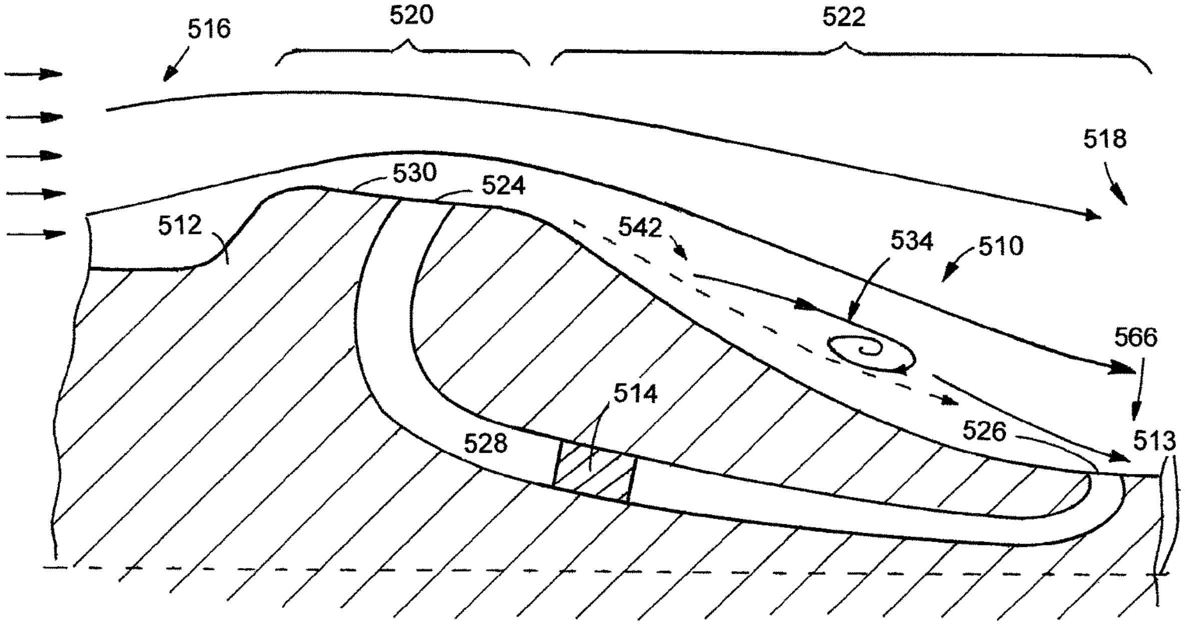
FIG. 8 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 8 illustrates another example fluid system 510. The fluid system 510 is similar to the fluid system 310 illustrated in FIG. 6 and described above, except as detailed below. The fluid system 510 includes a main body 512 and a fluid pressurizer 514.

In the illustrated embodiment, the main body 512 has a lengthwise axis 513, a first end 516, a second end 518, a first portion 520, a second portion 522, an injection opening 524, a suction opening 526, a channel 528 that extends from the suction opening 526 to the injection opening 524, and a side wall 530. The injection opening 524 is disposed on the first portion 520 of the main body 512 and the suction opening 526 is disposed on the second portion 522 of the main body 512. The injection opening 524 is disposed between the first end 516 of the main body 512 and the first end 542 of flow separation 534, illustrated in solid lines, and the suction opening 526 is disposed at the second end 466 of flow separation 434. When the fluid pressurizer 514 is in the on state, flow separation is removed, or reduced, as shown in phantom lines.

Figure 9:
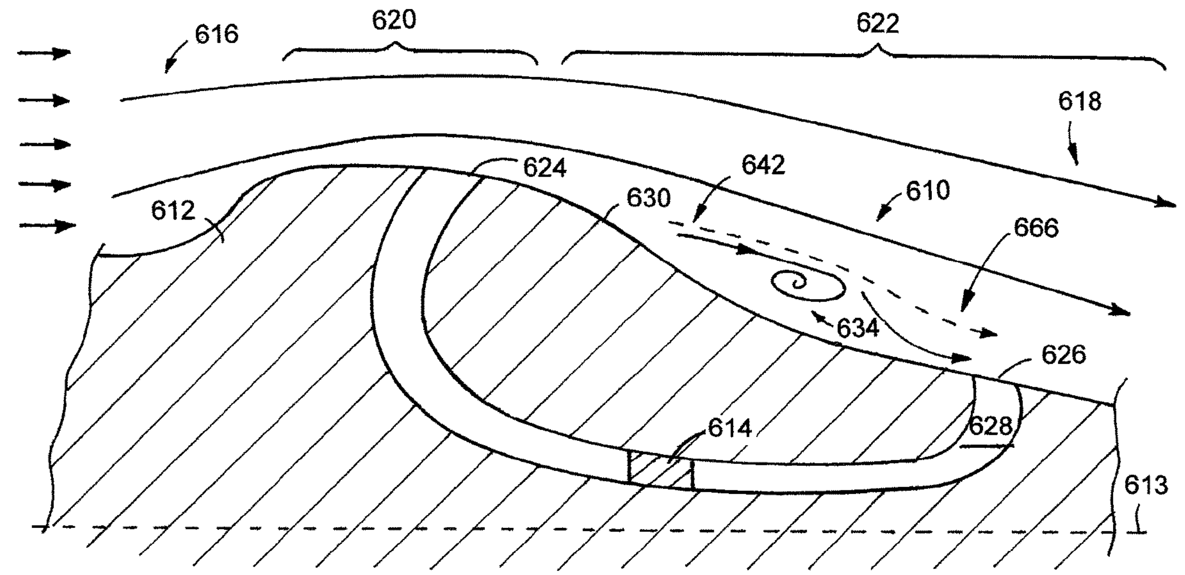
FIG. 9 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 9 illustrates another example fluid system 610. The fluid system 610 is similar to the fluid system 310 illustrated in FIG. 6 and described above, except as detailed below. The fluid system 610 includes a main body 612 and a fluid pressurizer 614.

In the illustrated embodiment, the main body 612 has a lengthwise axis 613, a first end 616, a second end 618, a first portion 620, a second portion 622, an injection opening 624, a suction opening 626, a channel 628 that extends from the suction opening 626 to the injection opening 624, and a side wall 630. The injection opening 624 is disposed on the first portion 620 of the main body 612 and the suction opening 626 is disposed on the second portion 622 of the main body 612. The injection opening 624 is disposed between the first end 616 of the main body 612 and the first end 642 of flow separation 634, shown in solid lines, and the suction opening 626 is disposed between the second end 666 of flow separation 634 and the second end 618 of the main body 612. When the fluid pressurizer 614 is in the on state, flow separation is removed, or reduced, as shown in phantom lines.

Figure 10:
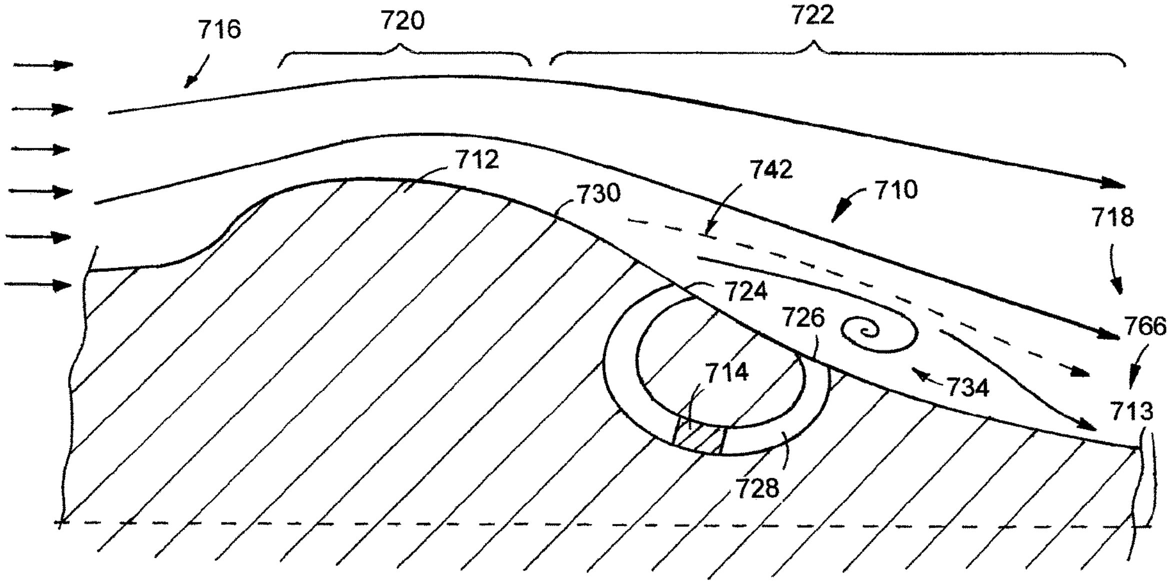
FIG. 10 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 10 illustrates another example fluid system 710. The fluid system 710 is similar to the fluid system 310 illustrated in FIG. 6 and described above, except as detailed below. The fluid system 710 includes a main body 712 and a fluid pressurizer 714.

In the illustrated embodiment, the main body 712 has a lengthwise axis 713, a first end 716, a second end 718, a first portion 720, a second portion 722, an injection opening 724, a suction opening 726, a channel 728 that extends from the suction opening 726 to the injection opening 724, and a side wall 730. Each of the injection opening 724 and the suction opening 726 is disposed on the second portion 722 of the main body 712. The injection opening 724 is disposed at the first end 742 of flow separation 734, shown in solid lines, and the suction opening 726 is disposed between the first end 742 of flow separation 734 and the second end 766 of flow separation 734. When the fluid pressurizer 714 is in the on state, flow separation is removed, or reduced, as shown in phantom lines.

Figure 11:
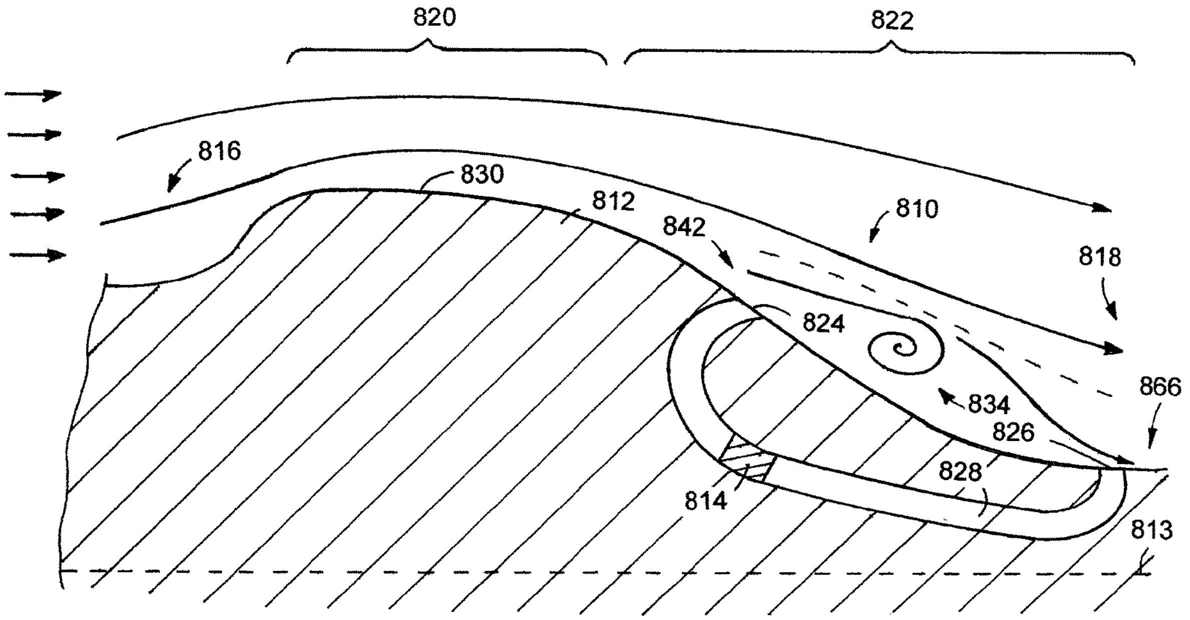
FIG. 11 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 11 illustrates another example fluid system 810. The fluid system 810 is similar to the fluid system 310 illustrated in FIG. 6 and described above, except as detailed below. The fluid system 810 includes a main body 812 and a fluid pressurizer 814.

In the illustrated embodiment, the main body 812 has a lengthwise axis 813, a first end 816, a second end 818, a first portion 820, a second portion 822, an injection opening 824, a suction opening 826, a channel 828 that extends from the suction opening 826 to the injection opening 824, and a side wall 830. Each of the injection opening 824 and the suction opening 826 is disposed on the second portion 822 of the main body 812. The injection opening 824 is disposed at the first end 842 of flow separation 834, shown in solid lines, and the suction opening 826 is disposed at the second end 866 of flow separation 834. When the fluid pressurizer 814 is in the on state, flow separation is removed, or reduced, as shown in phantom lines.

Figure 12:
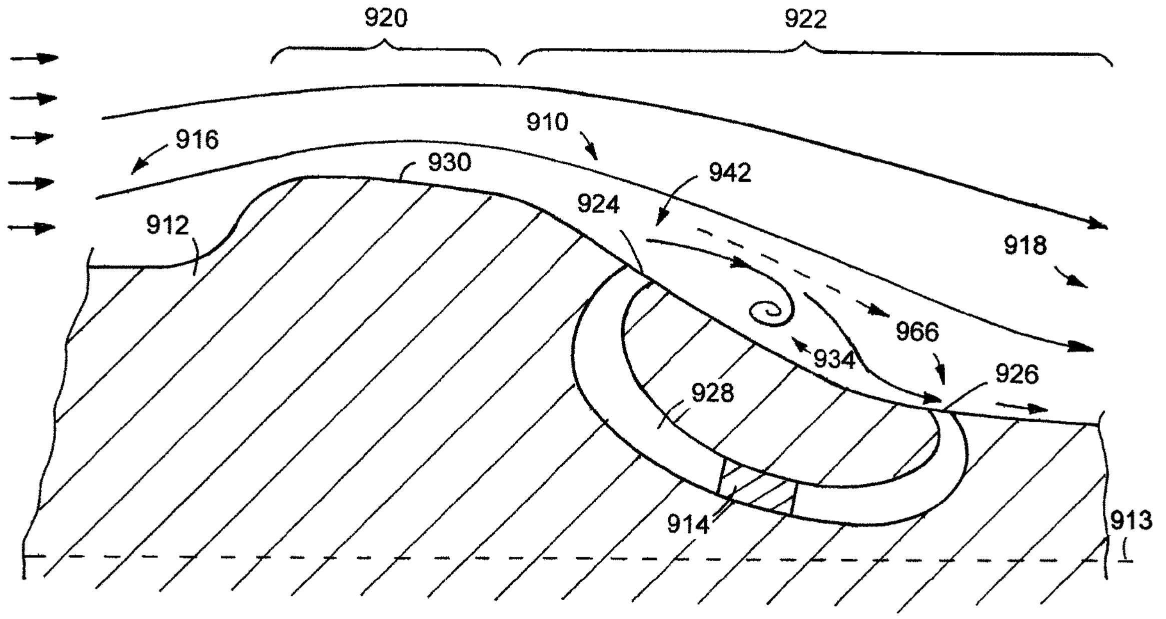
FIG. 12 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 12 illustrates another example fluid system 910. The fluid system 910 is similar to the fluid system 310 illustrated in FIG. 6 and described above, except as detailed below. The fluid system 910 includes a main body 912 and a fluid pressurizer 914.

In the illustrated embodiment, the main body 912 has a lengthwise axis 913, a first end 916, a second end 918, a first portion 920, a second portion 922, an injection opening 924, a suction opening 926, a channel 928 that extends from the suction opening 926 to the injection opening 924, and a side wall 930. Each of the injection opening 924 and the suction opening 926 is disposed on the second portion 922 of the main body 912. The injection opening 924 is disposed at the first end 942 of flow separation 934, shown in solid lines, and the suction opening 926 is disposed between the second end 966 of flow separation 934 and the second end 918 of the main body 912. When the fluid pressurizer 914 is in the on state, flow separation is removed, or reduced, as shown in phantom lines.

Figure 13:
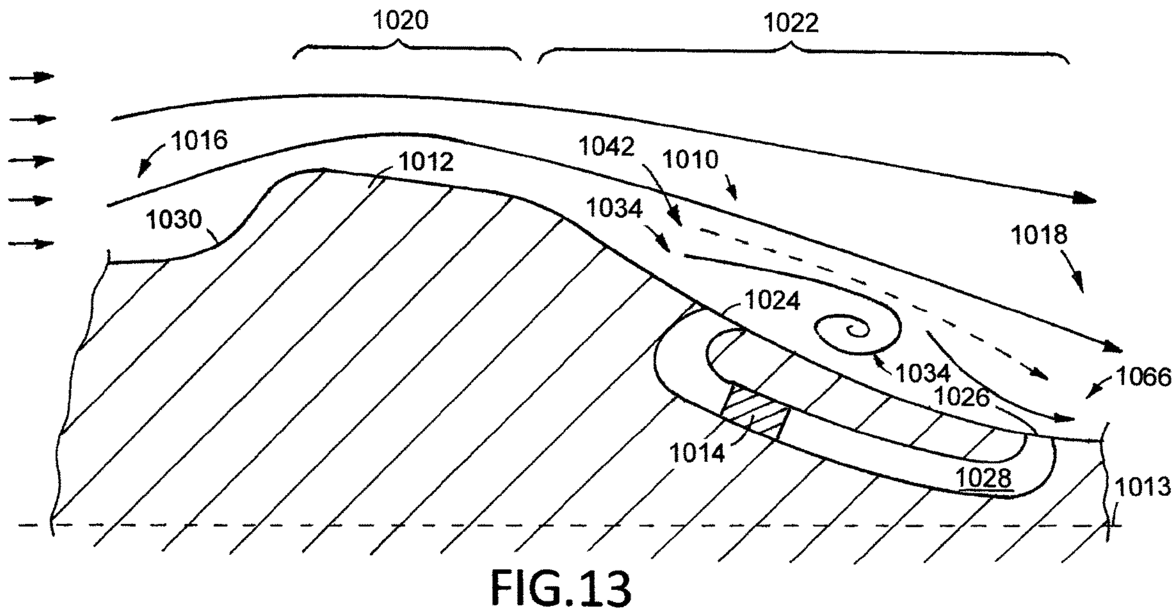
FIG. 13 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 13 illustrates another example fluid system 1010. The fluid system 1010 is similar to the fluid system 310 illustrated in FIG. 6 and described above, except as detailed below. The fluid system 1010 includes a main body 1012 and a fluid pressurizer 1014.

In the illustrated embodiment, the main body 1012 has a lengthwise axis 1013, a first end 1016, a second end 1018, a first portion 1020, a second portion 1022, an injection opening 1024, a suction opening 1026, a channel 1028 that extends from the suction opening 1026 to the injection opening 1024, and a side wall 1030. Each of the injection opening 1024 and the suction opening 1026 is disposed on the second portion 1022 of the main body 1012. The injection opening 1024 is disposed between the first end 1042 of flow separation 1034, shown in solid lines, and the second end 1066 of flow separation 1034 and the suction opening 1026 is disposed at the second end 1066 of flow separation 1034. When the fluid pressurizer 1014 is in the on state, flow separation is removed, or reduced, as shown in phantom lines.

Figure 14:
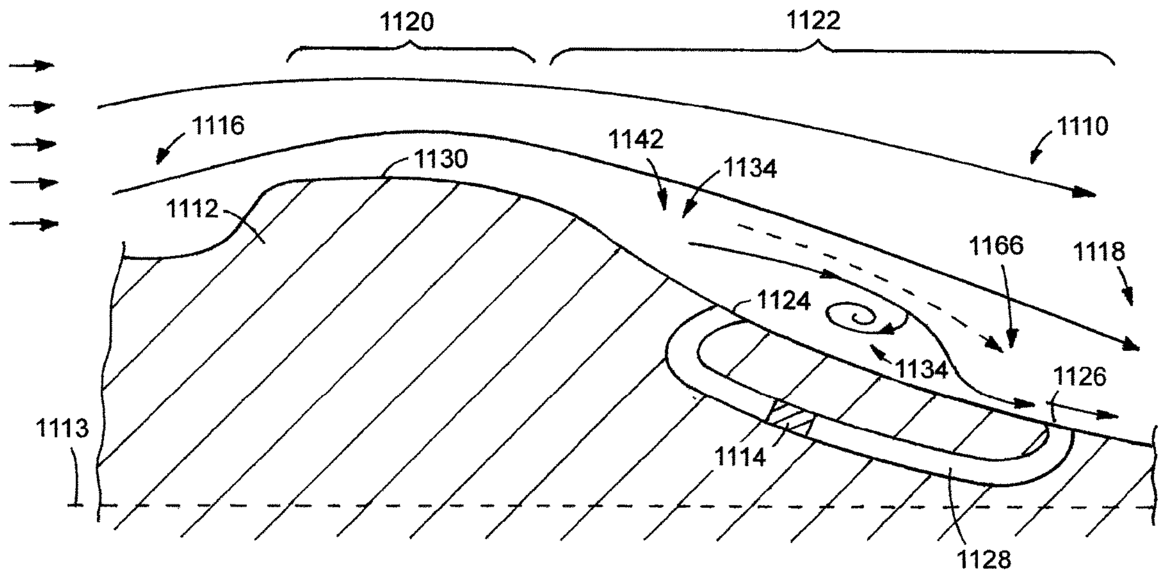
FIG. 14 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 14 illustrates another example fluid system 1110. The fluid system 1110 is similar to the fluid system 310 illustrated in FIG. 6 and described above, except as detailed below. The fluid system 1110 includes a main body 1112 and a fluid pressurizer 1114.

In the illustrated embodiment, the main body 1112 has a lengthwise axis 1113, a first end 1116, a second end 1118, a first portion 1120, a second portion 1122, an injection opening 1124, a suction opening 1126, a channel 1128 that extends from the suction opening 1126 to the injection opening 1124, and a side wall 1130. Each of the injection opening 1124 and the suction opening 1126 is disposed on the second portion 1122 of the main body 1112. The injection opening 1124 is disposed between the first end 1142 of flow separation 1134, shown in solid lines, and the second end 1166 of flow separation 1134 and the suction opening 1126 is disposed between the second end 1166 of flow separation 1134 and the second end 1118 of the main body 1112. When the fluid pressurizer 1114 is in the on state, flow separation is removed, or reduced, as shown in phantom lines.

Figure 15:
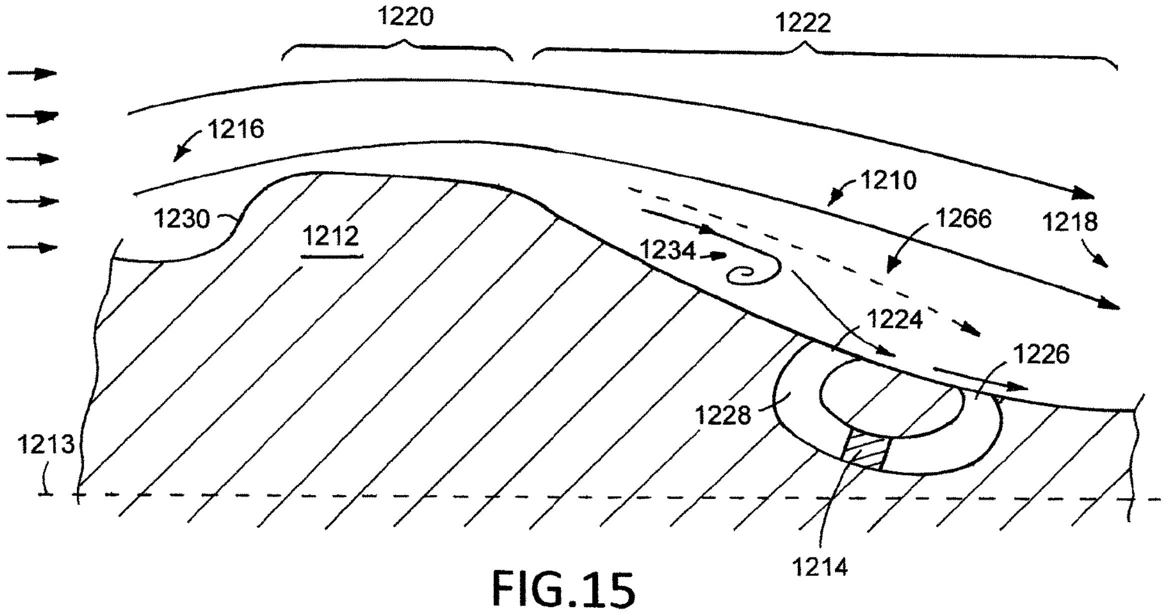
FIG. 15 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 15 illustrates another example fluid system 1210. The fluid system 1210 is similar to the fluid system 310 illustrated in FIG. 6 and described above, except as detailed below. The fluid system 1210 includes a main body 1212 and a fluid pressurizer 1214.

In the illustrated embodiment, the main body 1212 has a lengthwise axis 1213, a first end 1216, a second end 1218, a first portion 1220, a second portion 1222, an injection opening 1224, a suction opening 1226, a channel 1228 that extends from the suction opening 1226 to the injection opening 1224, and a side wall 1230. Each of the injection opening 1224 and the suction opening 1226 is disposed on the second portion 1222 of the main body 1212. The injection opening 1224 is disposed at the second end 1266 of flow separation 1234, shown in solid lines, and the suction opening 1226 is disposed between the second end 1266 of flow separation 1234 and the second end 1218 of the main body 1212. When the fluid pressurizer 1214 is in the on state, flow separation is removed, or reduced, as shown in phantom lines.

Figure 16:
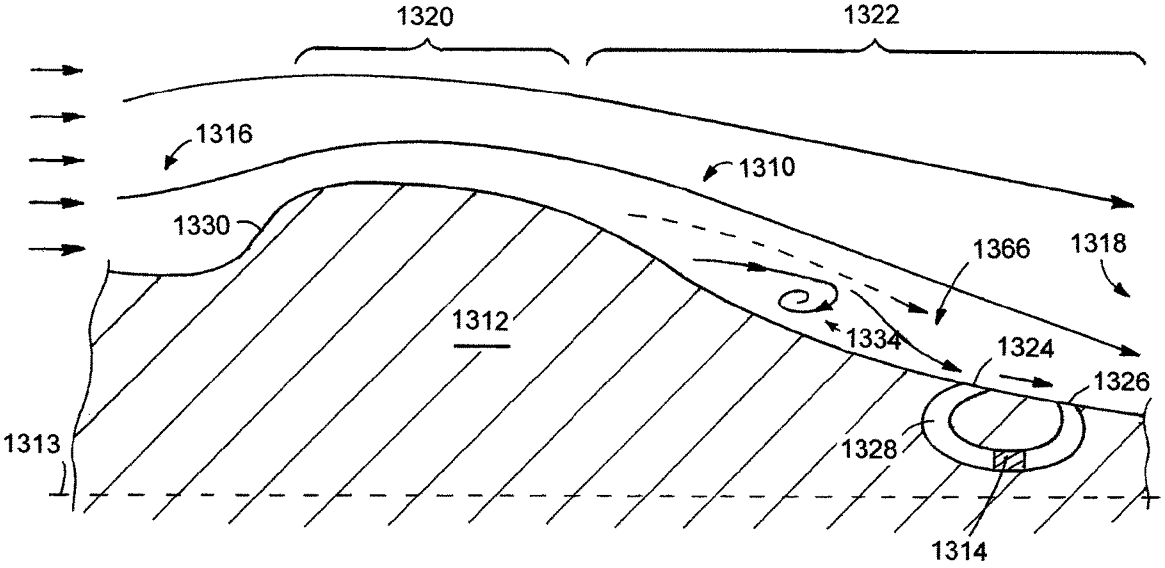
FIG. 16 is a partial cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 16 illustrates another example fluid system 1310. The fluid system 1310 is similar to the fluid system 310 illustrated in FIG. 6 and described above, except as detailed below. The fluid system 1310 includes a main body 1312 and a fluid pressurizer 1314.

In the illustrated embodiment, the main body 1312 has a lengthwise axis 1313, a first end 1316, a second end 1318, a first portion 1320, a second portion 1322, an injection opening 1324, a suction opening 1326, a channel 1328 that extends from the suction opening 1326 to the injection opening 1324, and a side wall 1330. Each of the injection opening 1324 and the suction opening 1326 is disposed on the second portion 1322 of the main body 1312. The injection opening 1324 is disposed between the second end 1366 of flow separation 1334, shown in solid lines, and the second end 1318 of the main body 1312 and the suction opening 1326 is disposed between the injection opening 1324 and the second end 1318 of the main body 1312. When the fluid pressurizer 1314 is in the on state, flow separation is removed, or reduced, as shown in phantom lines.

Figure 17:
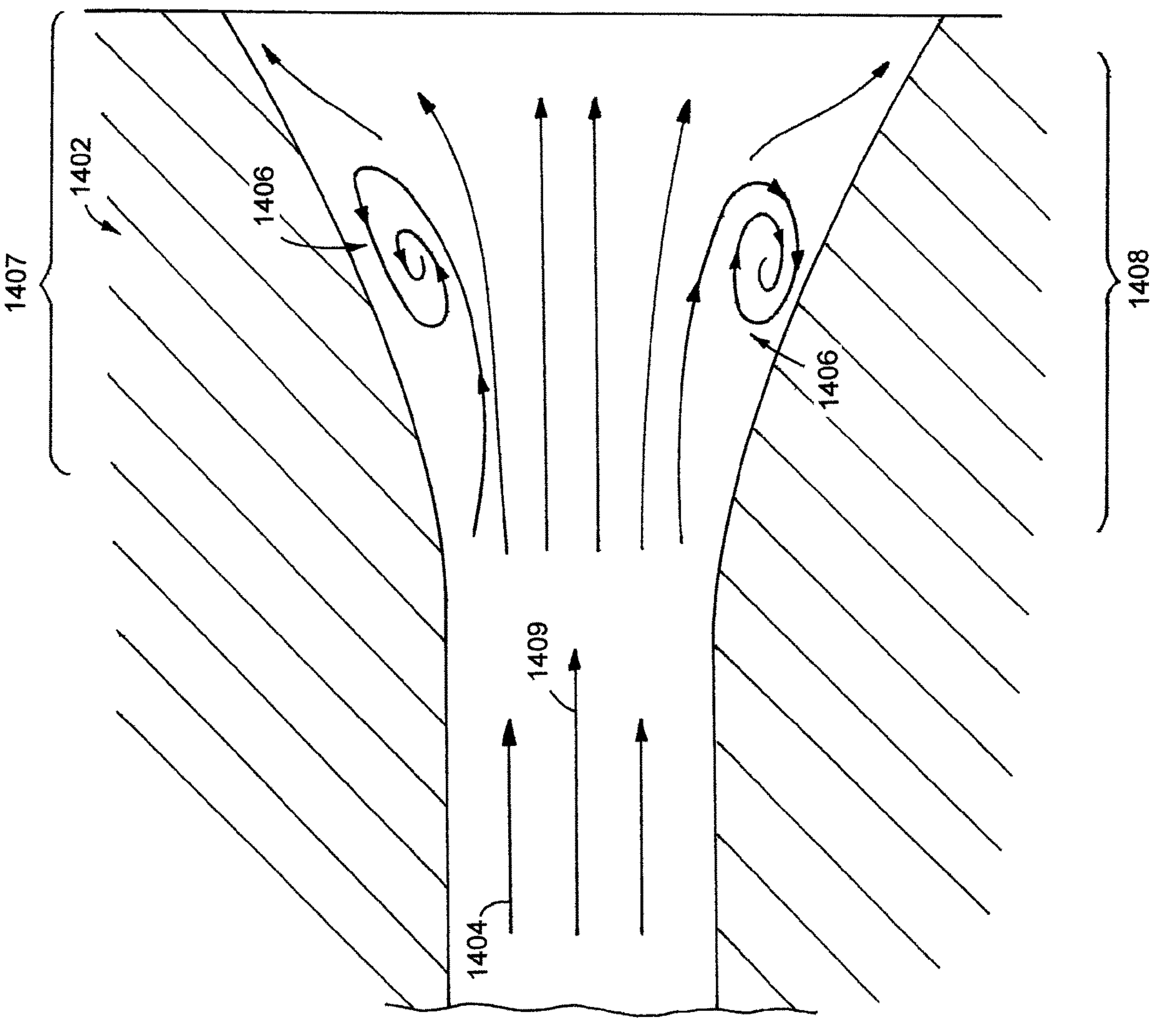
FIG. 17 is a partial cross-sectional view of a main body taken along the lengthwise axis of the main body and subjected to a fluid flow field.

FIG. 17 illustrates a main body 1402 subjected to a fluid flow field 1404. As shown in FIG. 17, flow separation 1406 occurs at a first location 1407 and a second location 1408 relative to the main body 1402 as fluid 1409 flows through the main body 1402, which results in high energy loss and undesirable flow characteristics through the main body 1402.

Figure 18:
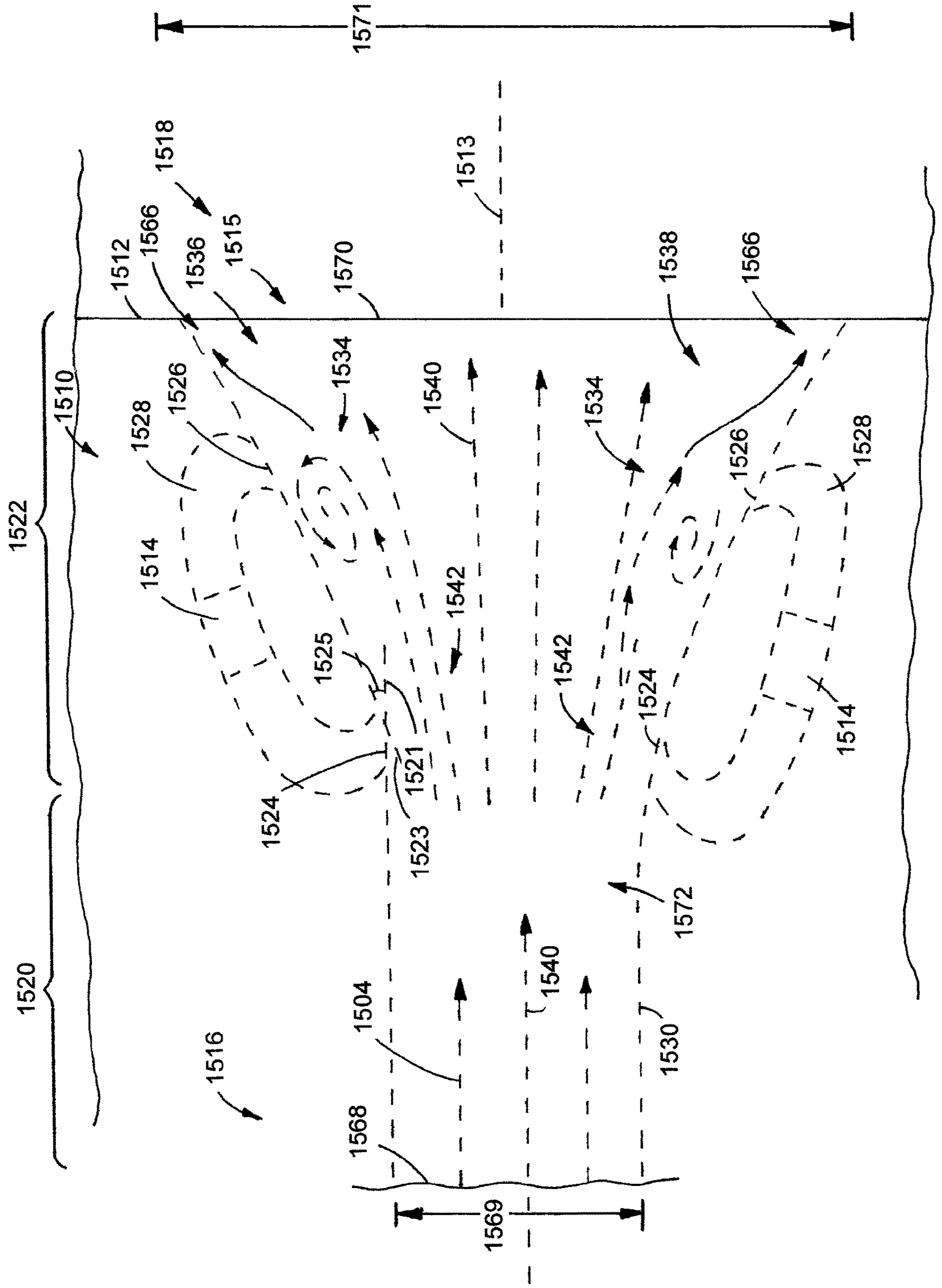
FIG. 18 is a partial elevation view of another example fluid system that addresses flow separation subjected to a fluid flow field. The fluid pressurizers are in an off state.
Figure 19:
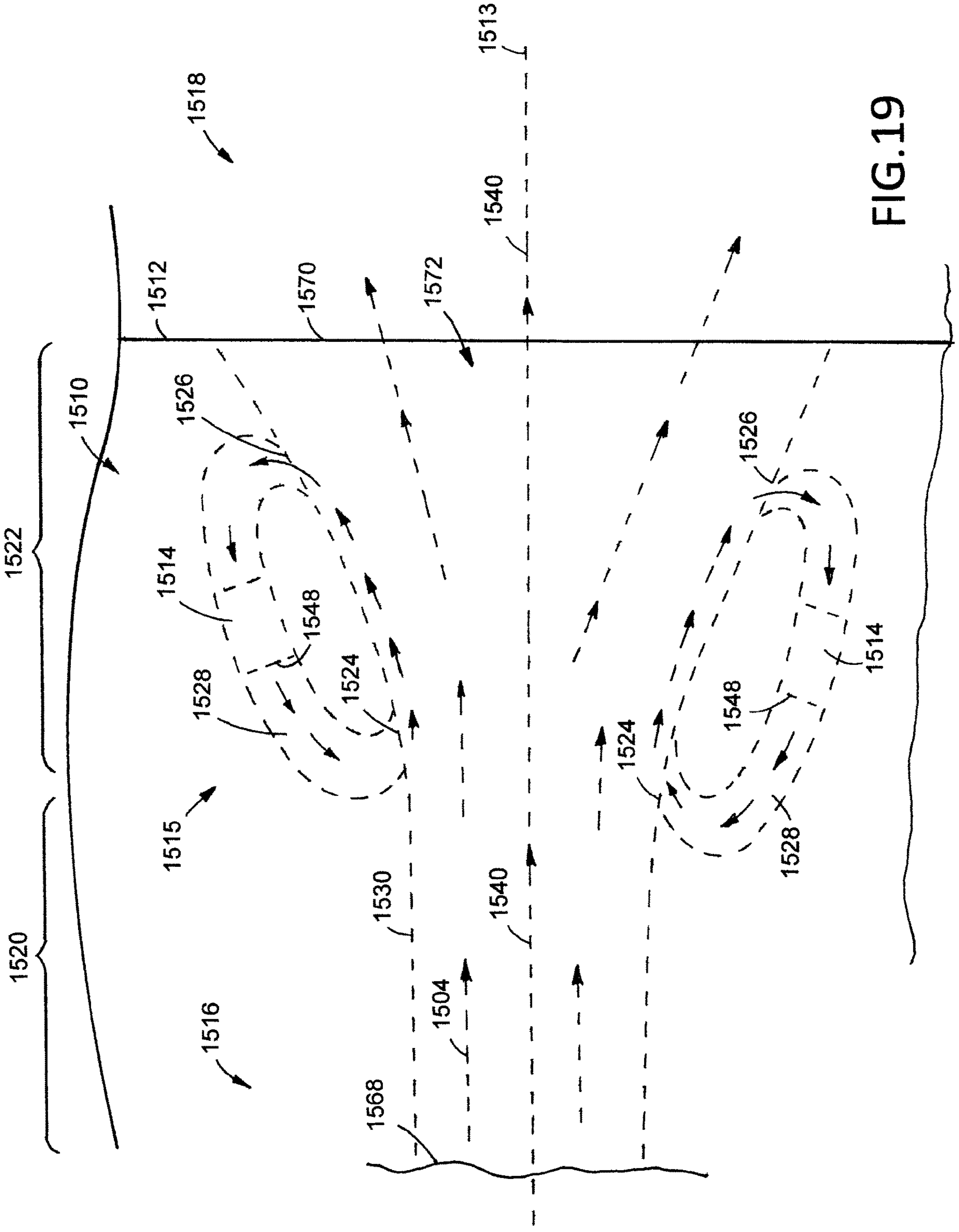
FIG. 19 illustrates the fluid system shown in FIG. 18 subjected to a fluid flow field with the fluid pressurizers in an on state.

FIGS. 18, 19, 20, 21, and 22 illustrate another example fluid system 1510 for addressing flow separation that is subjected to a fluid flow field 1504. The fluid system 1510 has a main body 1512 and a plurality of fluid pressurizers 1514. FIG. 18 illustrates the fluid system 1510 with the plurality of fluid pressurizers 1514 in the off state. FIG. 19 illustrates the fluid system 1510 with the plurality of fluid pressurizers 1514 in the on state.

The main body 1512 has a lengthwise axis 1513, a first end 1516, a second end 1518, a first portion 1520, a second portion 1522, an injection opening 1524, a suction opening 1526, a channel 1528 that extends from the suction opening 1526 to the injection opening 1524, a side wall 1530, a first opening 1568, a second opening 1570, and a passageway 1572 that extends from the first opening 1568 to the second opening 1570. The first portion 1520 is disposed between the first and second ends 1516, 1518 and has a first axis 1521 that extends along a portion of the side wall 1530. The second portion 1522 extends from the first portion 1520 toward the second end 1518 and has a second axis 1523 that extends along a portion of the side wall 1530. The first portion 1520 has a first cross-sectional shape taken along a plane that contains the lengthwise axis 1513 and the second portion 1522 has a second cross-sectional shape that is different than the first portion 1520 and taken along a plane that contains the lengthwise axis 1513. In the illustrated embodiment, the side wall 1530 along the first portion 1520 is substantially straight, the first axis 1521 is substantially parallel to the lengthwise axis 1513, the side wall 1530 along the second portion 1522 is curved and diverges, and the second axis 1523 is disposed at an angle 1525 relative to the first axis 1521. The angle 1525 is less than 35 degrees such that the second portion 1522 extends away from the lengthwise axis 1513 of the main body 1512 from the first portion 1520 toward the second end 1518. The first opening 1568 is an inlet opening for fluid 1540 flow and has a first inside diameter 1569 and the second opening 1570 is an outlet opening for fluid 1540 flow and has a second inside diameter 1571 such that fluid flows through the passageway 1572 from the first opening 1568 to the second opening 1570. The first inside diameter 1569 is less than the second inside diameter 1571. The first inside diameter 1569 extends along the first portion 1520 of the main body 1512. The inside diameter of the passageway 1572 increases from the first portion toward the second end 1522 and along the second portion 1522.

In the illustrated embodiment, the main body 1512 defines a diverging duct 1515 through which fluid 1540 flows and that has a circular cross-sectional configuration. While a duct 1515 is illustrated, a fluid system, such as those described herein, can be included in any suitable device, system, or structure through which fluid flows, such as those that have any suitable cross-sectional configuration (e.g., rectangular, square, elliptical, axisymmetric, non-axisymmetric). As show in in FIG. 18, flow separation 1534 occurs at a first location 1536 and a second location 1538 relative to the main body 1512 as fluid 1540 flows through the main body 1512. Each of the first location 1536 and the second location 1538 of flow separation 1534 is disposed adjacent the second portion 1522 and has a first end 1542, which is positioned at a location at which the flow separation 1536 begins (e.g., the boundary layer becomes separated from the main body 1512), and a second end 1566, which is positioned at a location at which the fluid flow 1540 reattaches to the main body 1512 (e.g., the boundary layer reattaches to the main body 1512).

Figure 20:
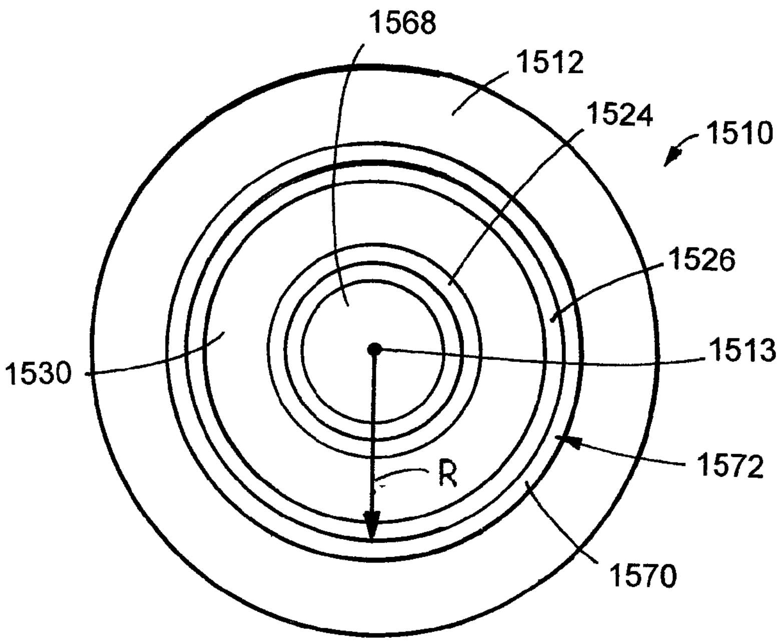
FIG. 20 is an end view of the fluid system illustrated in FIG. 18.
Figure 21:
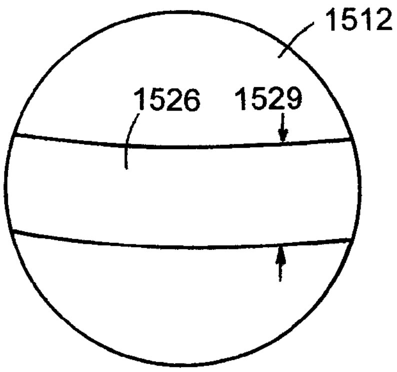
FIG. 21 is a magnified view of a portion of the fluid system illustrated in FIG. 18 that includes the suction opening.
Figure 22:
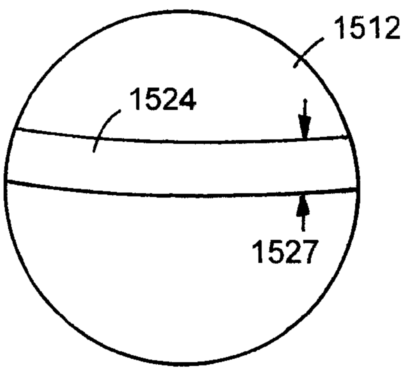
FIG. 22 is a magnified view of another portion of the fluid system illustrated in FIG. 18 that includes the injection opening.

The injection opening 1524 is disposed between the first end 1516 and the second end 1518 and the suction opening 1526 is disposed between the injection opening 1524 and the second end 1518. The channel 1528 extends from the suction opening 1526 to the injection opening 1524. As shown in each of FIGS. 18, 19, and 20, each of the injection opening 1524, the suction opening 1526, and the channel 1528 is a full annulus such that the injection opening 1524 completely encircles, or extends, around the lengthwise axis 1513 and the passageway 1572, the suction opening 1526 completely encircles, or extends, around the lengthwise axis 1513 and the passageway 1572, and the channel 1528 completely encircles, or extends, around the lengthwise axis 1513 and the passageway 1572. Alternative embodiments, however, can include injection openings, suction openings, and/or channels that are partial annuluses that only partially extend around a lengthwise axis of a main body and/or a passageway defined by a main body (e.g., 25%, 5%, or 75% around the a lengthwise axis of a main body and/or a passageway defined by a main body). As shown in FIG. 22 the injection opening 1524 has an injection opening width 1527 and, as shown in FIG. 20, has an injection opening area measured along the side wall 1530. As shown in FIG. 21 the suction opening 1526 has a suction opening width 1529 and, as shown in FIG. 20, has a suction opening area measured along the side wall 1530. The injection opening width 1527 is less than the suction opening width 1529 and the injection opening area is less than the suction opening area. In the illustrated embodiment, the injection opening width 1527 is equal to about 0.1 R wherein R is the radius of the passageway 1572 on a plane that is disposed orthogonally to the lengthwise axis 1513 and passes through the injection opening 1524. Alternative embodiments, however, can include an injection opening that has an injection opening width is equal to any suitable dimension, such as between about 0.00001 R and about 0.5 R, between about 0.001 R and about 0.05 R, or about 0.01 R, where R is the radius of a passageway on a plane that is disposed orthogonally to a lengthwise axis of a main body and passes through an injection opening. While particular widths and areas have been illustrated, an injection opening and suction opening can have any suitable opening widths and/or areas. For example, a suction opening area can be greater than an injection opening area such that the maximum flow rate can be passed through an the injection opening during use.

In the illustrated embodiment, each of the injection opening 1524 and the suction opening 1526 is disposed on the second portion 1522 of the main body 1512. The injection opening 1524 is disposed between the first end 1542 of flow separation 1534 and the second end 1566 of flow separation and the suction opening 1526 is disposed between the injection opening 1524 and the second end 1566 of flow separation 1534. While the injection opening 1524 and suction opening 1566 have been illustrated at specific locations on the main body 1512, as described herein, an injection opening and suction opening can be located at any suitable location relative to the main body and/or flow separation. Selection of a suitable location to position an injection opening and a suction opening on a main body can be based on various considerations, including the intended use of the main body. Examples of suitable locations to position an injection opening and/or a suction opening include on a first portion of a main body, on a second portion of a main body, between a first end of a main body and a first end of flow separation, between a first portion of a main body and a first end of flow separation, between a first end of flow separation and a second end of flow separation, between a first end of flow separation and a second end of a main body, between a second end of flow separation and a second end of a main body, and any other location considered suitable for a particular embodiment.

Each fluid pressurizer of the plurality of fluid pressurizers 1514 is disposed within the channel 1528 and is moveable between on and off states such that fluid flows into the suction opening 1526 and out of the injection opening 1524 when the fluid pressurizer 1514 is in the on state. In the off state, each fluid pressurizer of the plurality of fluid pressurizers 1514 does not pressurize fluid passing through the channel 1528. In the on state, each fluid pressurizer of the plurality of fluid pressurizers 1514 draws fluid through the suction opening 1526, through the fluid pressurizer, and pushes fluid out of the discharge port 1548 and the injection opening 1524. When in the on state, the fluid entering the channel 1528 at the suction opening 1526 has a first velocity and the fluid exiting the channel 1528 at the injection opening 1524 has a second velocity that is greater than the first velocity and is directed tangential to the main body 1512. In addition, the fluid entering the channel 1528 at the suction opening 1526 has a first total pressure and the fluid exiting the channel 1528 at the injection opening 1524 has a second total pressure that is greater than the first total pressure.

Figure 23:
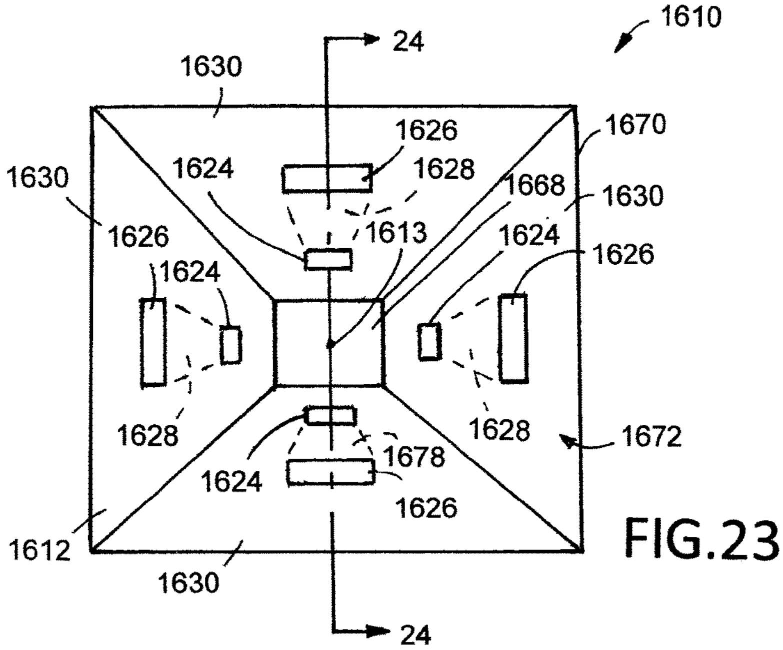
FIG. 23 is an end view of another example fluid system that addresses flow separation.
Figure 24:
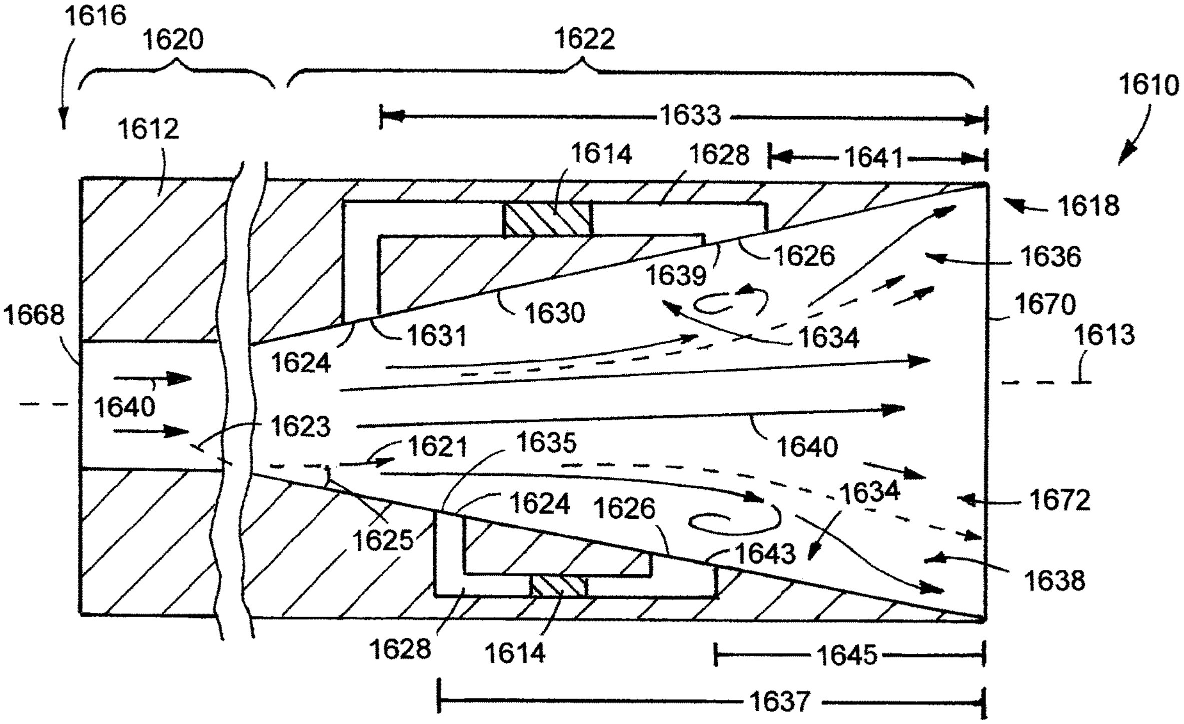
FIG. 24 is a cross-sectional view of FIG. 23 taken along line 24-24. The fluid system is subjected to a fluid flow field. The fluid pressurizers are in an off state and the solid fluid lines illustrate flow separation. The phantom fluid lines illustrate no flow separation when the fluid pressurizers are in the on state.

FIGS. 23 and 24 illustrate another example fluid system 1610 for addressing flow separation that is subjected to a fluid flow field 1604. The fluid system 1610 is similar to the fluid system 1510 illustrated in FIGS. 18, 19, 20, 21, and 22 and described above, except as detailed below. The fluid system 1610 has a main body 1612 and a plurality of fluid pressurizers 1614. FIG. 24 illustrates the fluid system 1610 with the plurality of fluid pressurizers 1614 in the off state and subjected to a fluid flow field.

In the illustrated embodiment, the main body 1612 has a lengthwise axis 1613, a first end 1616, a second end 1618, a first portion 1620, a second portion 1622, a plurality of injection openings 1624, a plurality of suction openings 1626, a plurality of channels 1628, a side wall 1630, a first opening 1668, a second opening 1670, and a passageway 1672 that extends from the first opening 1668 to the second opening 1670. Each channel of the plurality of channels 1628 extends from a suction opening of the plurality of suction openings 1626 to an injection opening of the plurality of injection openings 1624. The side wall 1630 along the first portion 1620 is substantially straight, the first axis 1621 is substantially parallel to the lengthwise axis 1613, the side wall 1630 along the second portion 1622 is substantially straight and diverges, and the second axis 1623 is disposed at an angle 1625 relative to the first axis 1621. The angle 1625 is less than 45 degrees such that the second portion 1622 extends away from the lengthwise axis 1613 of the main body 1612 from the first portion 1620 toward the second end 1618.

As show in in FIG. 24, flow separation 1634, illustrated in solid lines, occurs at a first location 1636 and a second location 1638 relative to the main body 1612 as fluid 1640 flows through the main body 1612. Flow separation would also occur at other locations not illustrated (e.g., on a plane perpendicular to that illustrated in FIG. 24). When the fluid pressurizers 1614 are in the on state, flow separation is removed, or reduced, as shown in phantom lines in FIG. 24. As shown in FIG. 23, each of the injection openings 1624, the suction openings 1626, and the channels 1628 only partially surrounds the lengthwise axis 1613 and the passageway 1672. A first injection opening 1631 of the plurality of injection openings 1624 is disposed a first distance 1633 from the second end 1618. A second injection opening 1635 of the plurality of injection openings 1624 is disposed a second distance 1637 from the second end 1618. A first suction opening 1639 of the plurality of suction openings 1626 is disposed a third distance 1641 from the second end 1618. A second suction opening 1643 of the plurality of suction openings 1626 is disposed a fourth distance 1645 from the second end 1618. The first distance 1633 is greater than the second distance 1637. The third distance 1641 is less than the fourth distance 1645.

Each fluid pressurizer of the plurality of fluid pressurizers 1614 is disposed within a channel of the plurality of channels 1628 and is moveable between on and off states such that fluid flows into a suction opening of the plurality of suction openings 1626 and out of an injection opening of the plurality of injection openings 1624 when the fluid pressurizer is in the on state.

Figure 25:
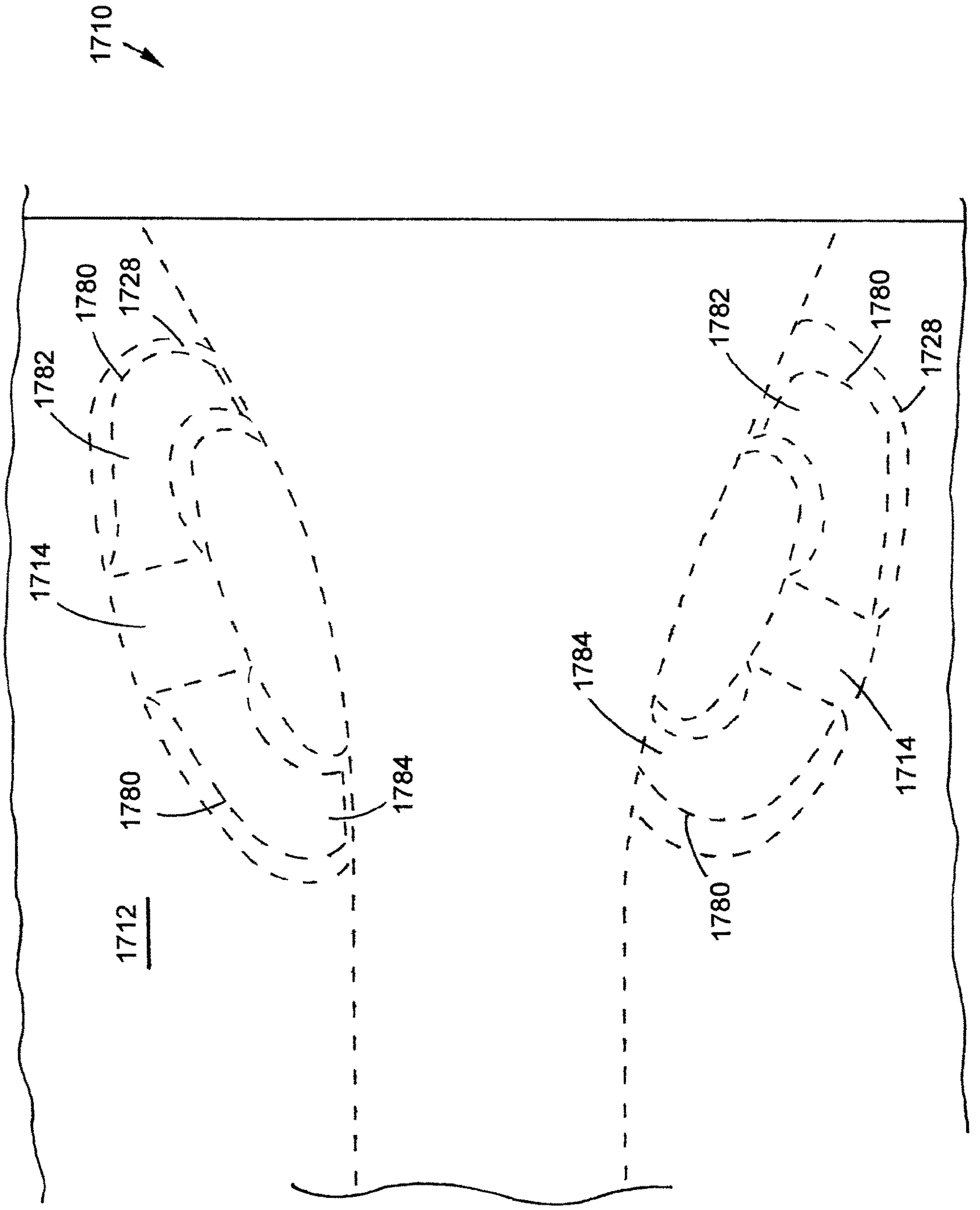
FIG. 25 is an elevation view of another example fluid system that addresses flow separation.

FIG. 25 illustrate another example fluid system 1710 for addressing flow separation. The fluid system 1710 is similar to the fluid system 1510 illustrated in FIGS. 18, 19, 20, 21, and 22 and described above, except as detailed below. The fluid system 1710 has a main body 1712 and a plurality of fluid pressurizers 1714.

In the illustrated embodiment, a plurality of ducts 1780 is disposed within the channel 1728 and includes a suction duct 1782 and an injection duct 1784. Each duct of the plurality of ducts 1780 is attached to a port of the fluid pressurizer of the plurality of fluid pressurizers 1714, is entirely disposed within the channel 1728. A duct can have any suitable structural arrangement, be attached to a fluid pressurizer and/or main body using any suitable technique or method of attachment, and be disposed within any suitable number of channels defined by a main body. Examples of structural arrangements for a duct, attachments between a duct and a fluid pressurizer and/or main body, and other features of a duct are described in U.S. patent application Ser. No. 16/252,943 by Zha and filed on Jan. 21, 2019, which is incorporated by reference herein in its entirety.

Figure 26:
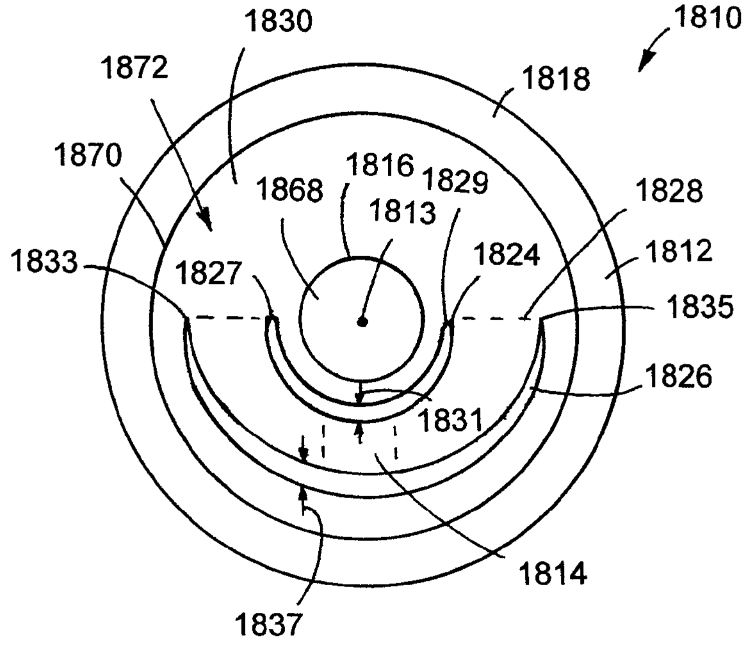
FIG. 26 is an end view of another example fluid system that addresses flow separation.

FIG. 26 illustrates another example fluid system 1810 for addressing flow separation. The fluid system 1810 is similar to the fluid system 1510 illustrated in FIGS. 18, 19, 20, 21, and 22 and described above, except as detailed below. The fluid system 1810 has a main body 1812 and a fluid pressurizer 1814.

In the illustrated embodiment, the main body 1812 has a lengthwise axis 1813, a first end 1816, a second end 1818, an injection opening 1824, a suction opening 1826, a channel 1828, a side wall 1830, a first opening 1868, a second opening 1870, and a passageway 1872 that extends from the first opening 1868 to the second opening 1870. As shown, the injection opening 1824, the suction opening 1826, and the channel 1828 only partially surrounds the lengthwise axis 1813 and the passageway 1872. The injection opening 1824 has a first end 1827, a second end 1829, and an injection opening width 1831 that varies circumferentially around lengthwise axis 1813 of the main body 1812. The suction opening 1826 has a first end 1833, a second end 1835, and a suction opening width 1837 that varies circumferentially around lengthwise axis 1813 of the main body 1812. The injection opening width 1831 tapers from a location between the first and second ends 1827, 1829 of the injection opening toward the first end 1827 and toward the second end 1829. The suction opening width 1837 tapers from a location between the first and second ends 1833, 1835 of the suction opening toward the first end 1833 and toward the second end 1835. This structural configuration assists with the reduction, or removal, of vortices created by the main body. However, alternative embodiments can include first and second ends of an opening (e.g., injection opening, suction opening) that are partial squares or partial rectangles.

Figure 27:
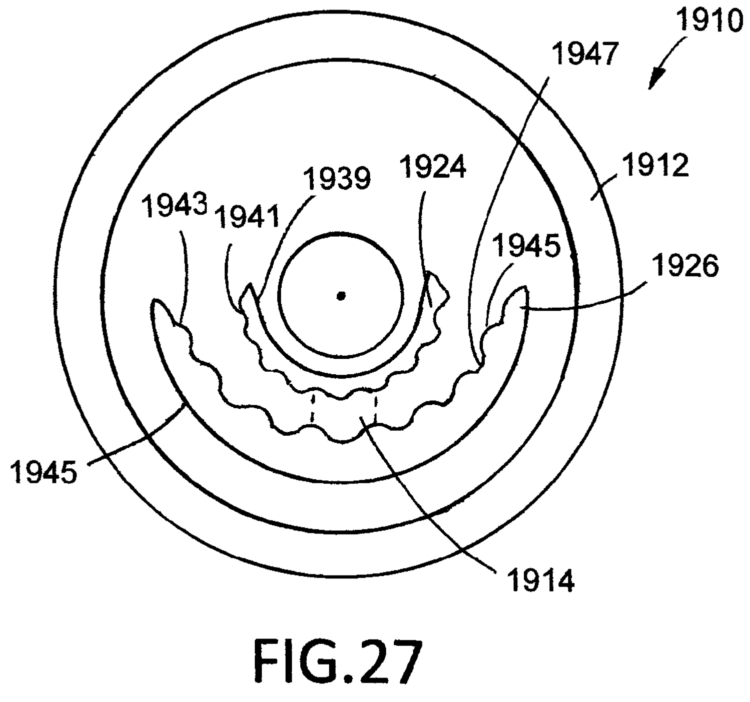
FIG. 27 is an end view of another example fluid system that addresses flow separation.

FIG. 27 illustrates another example fluid system 1910 for addressing flow separation. The fluid system 1910 is similar to the fluid system 1810 illustrated in FIG. 26 and described above, except as detailed below. The fluid system 1910 has a main body 1912 and a fluid pressurizer 1914.

In the illustrated embodiment, the injection opening 1924 has a first edge 1939 and a second edge 1941 and the suction opening 1926 has a first edge 1943 and a second edge 1945. Each of the second edge 1941 of the injection opening 1924 and the first edge 1943 of the suction opening 1926 defines a sinusoidal edge. The sinusoidal edge comprises a plurality of peaks 1945 and troughs 1947 that can have any suitable amplitude (e.g., peak to peak amplitude) and frequency and selection of a suitable amplitude and frequency can be based on various considerations, including the desired flow characteristics intended to be achieved. A sinusoidal edge can be included on any edge of an injection opening and/or suction opening, such as those described herein.

Figure 28:
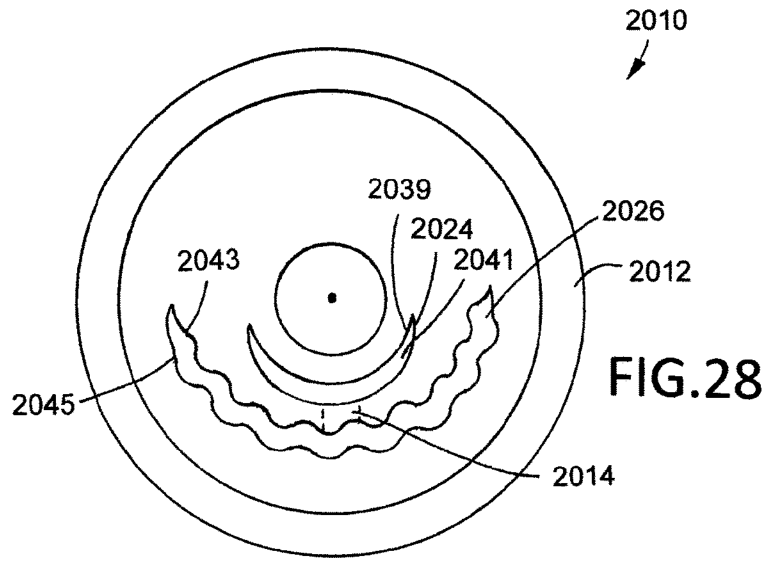
FIG. 28 is an end view of another example fluid system that addresses flow separation.

FIG. 28 illustrates another example fluid system 2010 for addressing flow separation. The fluid system 2010 is similar to the fluid system 1810 illustrated in FIG. 26 and described above, except as detailed below. The fluid system 2010 has a main body 2012 and a fluid pressurizer 2014.

In the illustrated embodiment, the injection opening 2024 has a first edge 2039 and a second edge 2041 and the suction opening 2026 has a first edge 2043 and a second edge 2045. Each of the first edge 2039 and the second edge 2041 of the injection opening 2024 defines a substantially uninterrupted curved edge. Each of the first edge 2043 and the second edge 2045 of the suction opening 2026 defines a sinusoidal edge. A substantially uninterrupted curved edge can be included on any edge of an injection opening and/or suction opening, such as those described herein.

Figure 29:
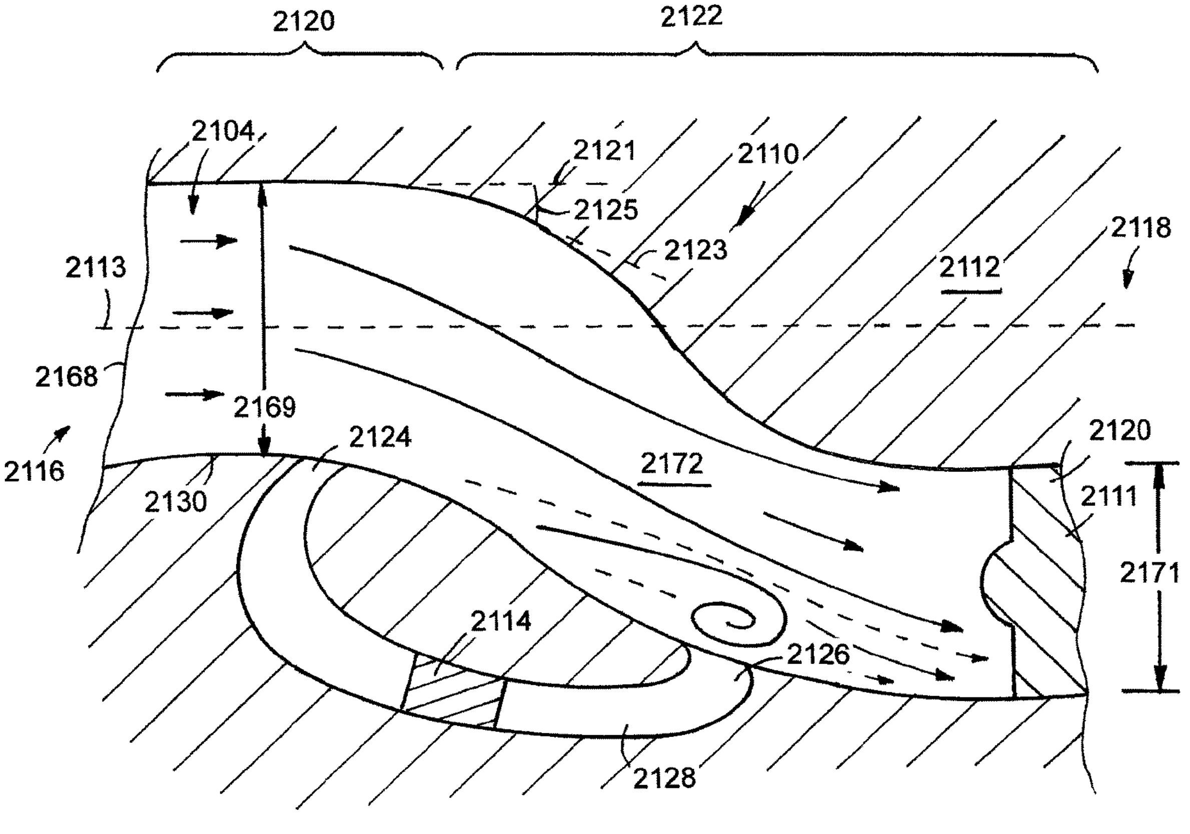
FIG. 29 is a cross-sectional view of another example fluid system that addresses flow separation taken along the lengthwise axis of the main body and subjected to a fluid flow field. The fluid pressurizer is in an off state and the solid fluid lines illustrate flow separation. The phantom fluid lines illustrate no flow separation when the fluid pressurizer is in the on state.

FIG. 29 illustrates another example fluid system 2110 for addressing flow separation that is subjected to a fluid flow field 2104. The fluid system 2110 is similar to the fluid system 1510 illustrated in FIGS. 18, 19, 20, 21, and 22 and described above, except as detailed below. The fluid system 2110 has a main body 2112 and a fluid pressurizer 2114 and is included in a system that has an attached engine 2111 (e.g., jet engine).

The main body 2112 has a lengthwise axis 2113, a first end 2116, a second end 2118, a first portion 2120, a second portion 2122, an injection opening 2124, a suction opening 2126, a channel 2128 that extends from the suction opening 2126 to the injection opening 2124, a side wall 2130, a first opening 2168, a second opening 2170, and a passageway 2172 that extends from the first opening 2168 to the second opening 2170. The first portion 2120 is disposed between the first and second ends 2116, 2118 and has a first axis 2121 that extends along a portion of the side wall 2130. The second portion 2122 extends from the first portion 2120 toward the second end 2118 and has a second axis 2123 that extends along a portion of the side wall 2130. The first portion 2120 has a first cross-sectional shape taken along a plane that contains the lengthwise axis 2113 and the second portion 2122 has a second cross-sectional shape that is different than the first portion 2120 and taken along a plane that contains the lengthwise axis 2113. In the illustrated embodiment, the side wall 2130 along the first portion 2120 is substantially straight, the first axis 2121 is substantially parallel to the lengthwise axis 2113, the side wall 2130 along the second portion 2122 is curved, and the second axis 2123 is disposed at an angle 2125 relative to the first axis 2121. The angle 2125 is less than 35 degrees such that the second portion 2122 extends away from the lengthwise axis 2113 of the main body 2112 from the first portion 2120 toward the second end 2118. The first opening 2168 is an inlet opening for fluid flow and has a first inside diameter 2169 and the second opening 2170 is an outlet opening for fluid flow and has a second inside diameter 2171 such that fluid flows through the passageway 2172 from the first opening 2168 to the second opening 2170. The first inside diameter 2169 is equal to the second inside diameter 2171 such that the inside diameter of the passageway 2172 is constant from the first end 2120 to the second end 2122. An engine can be included in any suitable passageway of a fluid system, such as those described herein.

A main body, an injection opening, a suction opening, a channel, a fluid pressurizer, a duct, and any other feature, element, or component described herein and included in a fluid system can be formed of any suitable material, manufactured using any suitable technique, and formed of a single piece of material or multiple pieces of material attached to one another. Selection of a suitable material to form a main body, an injection opening, a suction opening, a channel, a fluid pressurizer, a duct, and any other feature, element, or component described herein and included in a fluid system and a suitable technique to manufacture a main body, an injection opening, a suction opening, a channel, a fluid pressurizer, a duct, and any other feature, element, or component described herein and included in a fluid system can be based on various considerations, including the intended use of the fluid system. Examples of materials considered suitable to form a main body, an injection opening, a suction opening, a channel, a fluid pressurizer, a duct, and/or any other feature, element, or component described herein include conventional materials, metals, steel, aluminum, alloys, plastics, combinations of metals and plastics, composite materials, combinations of the materials described herein, and any other material considered suitable for a particular embodiment. Examples of methods of manufacture considered suitable to manufacture a main body, an injection opening, a suction opening, a channel, a fluid pressurizer, a duct, and/or any other feature, element, or component described herein include conventional methods and techniques, injection molding, machining, 3D printing, and/or any other method or technique considered suitable for a particular embodiment. For example, a main body of a fluid system can be formed of a first material and each duct included in the fluid system can be formed of a second material that is different than the first material. While the various features, elements, and components described herein and included in a fluid system have been illustrated as having a particular structural configuration, any feature, element, or component described herein and included in a fluid system can have any suitable structural arrangement. Selection of a suitable structural arrangement for a feature, element, or component described herein and included in a fluid system can be based on various considerations, including the intended use of the fluid system.

Any of the herein described examples of fluid systems, and any of the features described relative to a particular example of a fluid system, can be included along a portion, or the entirety, of the length, width, and/or depth of any device, system, component in which it is desired to include a fluid system. For example, any of the herein described embodiments, such as the fluid systems and/or ducts, can be combined in any suitable manner and include any of the features, devices, systems, and/or components described in U.S. patent application Ser. No. 15/426,084 by Zha and filed on Feb. 7, 2017, which is incorporated by reference herein in its entirety, U.S. patent application Ser. No. 15/255,523 by Zha and filed on Sep. 2, 2016, which is incorporated by reference herein in its entirety, U.S. patent application Ser. No. 16/135,120 by Zha and filed on Sep. 19, 2018, which is incorporated by reference herein in its entirety, U.S. patent application Ser. No. 16/445,822 by Zha and filed on Jun. 19, 2019, which is incorporated by reference herein in its entirety, and/or U.S. patent application Ser. No. 16/252,943 by Zha and filed on Jan. 21, 2019, which is incorporated by reference herein in its entirety.

Figure 30:
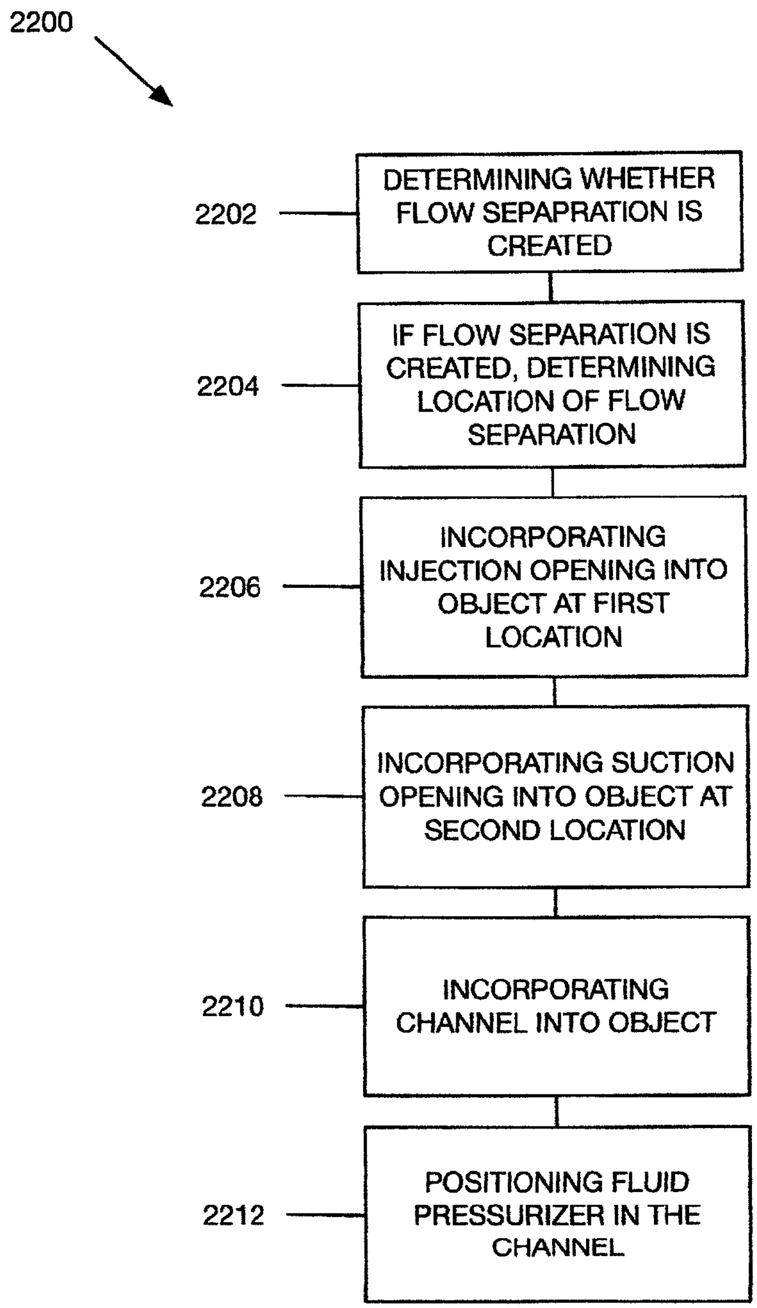
FIG. 30 is a schematic illustration of an example method of incorporating a fluid system into object.

FIG. 30 is a schematic illustration of an example method 2200 of incorporating a fluid system into an object (e.g., main body).

A step 2202 comprises determining whether flow separation is created by an object when the object is subjected to fluid flow. If flow separation is created, another step 2204 comprises determining the location of flow separation relative to the object. Another step 2206 comprises incorporating an injection opening into the object at a first location relative to the flow separation. Another step 2208 comprises incorporating a suction opening into the object at a second location relative to the flow separation. Another step 2210 comprises incorporating a channel into the object that extends from the suction opening to the injection opening. Another step 2212 comprises positioning a fluid pressurizer in the channel.

Step 2202 and step 2204 can be accomplished using computational fluid dynamics (CFD) software by simulating the fluid flow over the object or by using wind tunnel testing with flow measurement and flow visualization.

Step 2206, step 2208, step 2210, and step 2212 can be accomplished by incorporating the features of a fluid system according to an embodiment described herein into the object.

An optional step comprises determining a flow rate and/or pressure ratio of the fluid pressurizer to remove the flow separation (e.g., with the minimal amount of power for the whole operation range of the main body). Another optional step comprises activating the fluid pressurizer at the determined flow rate to remove the flow separation.

While the fluid systems described herein have been included in objects (e.g., main bodies) that form flow separation when the object is subjected to fluid flow, the fluid systems described herein, and associated methods, can be included in objects that form non-uniform or distort total pressure when the object is subjected to fluid flow to improve the uniformity and/or reduce the distortion of fluid flow around the object. The fluid systems described herein can be applied to any suitable main body, such as main bodies that form a duct, a passageway, turbomachinery, turbomachinery blade passageways, vehicles, ship bodies, automobiles, aircraft wings, blades, and any other main body considered suitable for a particular embodiment.

Those with ordinary skill in the art will appreciate that various modifications and alternatives for the described and illustrated examples can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor simply to describe and illustrate examples of the invention and are not intended to limit the scope of the invention or its protection, which is to be given the full breadth of the appended claims and any and all equivalents thereof.

What is claimed is:

1. A fluid system for addressing flow separation having a first end and a second end, the fluid system comprising:

a main body having a first end, a second end, a first portion, a second portion, an injection opening, a suction opening, a channel, and a side wall;

the first portion disposed between the first end of the main body and the second end of the main body, the second portion extending from the first portion toward the second end of the main body, the first portion having a first axis extending along the side wall, the second portion having a second axis extending along the side wall at an angle relative to the first axis such that when fluid flows over the main body said flow separation is defined adjacent to the second portion;

the injection opening disposed between the first end of the main body and the second end of the main body and at a first location relative to said flow separation;

the suction opening disposed between the injection opening and the second end of the main body and at a second location relative to said flow separation;

the channel extending from the suction opening to the injection opening; and a fluid pressurizer disposed within the channel and moveable between on and off states such that fluid flows into the suction opening and out of the injection opening when the fluid pressurizer is in the on state;

wherein either:

the first location is disposed at said first end of said flow separation;

the first location is disposed between said first end of said flow separation and said second end of said flow separation;

the first location is disposed at said second end of said flow separation;

the first location is disposed between said second end of said flow separation and the second end of the main body;

the second location is disposed at said first end of said flow separation;

the second location is disposed at said second end of said flow separation;

the second location is disposed between said second end of said flow separation and the second end of the main body; or the main body has a first opening at the first end of the main body, a second opening at the second end of the main body, and a passageway extending from the first opening to the second opening.

2. The fluid system of claim 1, wherein the main body has a lengthwise axis;

wherein the first portion has a first cross-sectional shape taken along a plane that contains the lengthwise axis; and wherein the second portion has a second cross-sectional shape taken along a plane that contains the lengthwise axis that is different than the first cross-sectional shape.

3. The fluid system of claim 1, wherein the second axis is disposed at an angle between about 0 degrees and about 90 degrees relative to the first axis.

4. The fluid system of claim 3, wherein the angle is less than 45 degrees.

5. The fluid system of claim 1, wherein said flow separation is reduced when the fluid pressurizer is in the on state.

6. The fluid system of claim 1, wherein the first location is disposed between the first end of the main body and said flow separation.

7. The fluid system of claim 1, wherein the second location is disposed between the first end of the main body and said flow separation.

8. The fluid system of claim 1, wherein the second location is disposed between said first end of said flow separation and said second end of said flow separation.

9. The fluid system of claim 1, wherein the main body has a lengthwise axis;

wherein the injection opening completely extends around the lengthwise axis of the main body and the passageway; and wherein the suction opening completely extends around the lengthwise axis of the main body and the passageway.

10. The fluid system of claim 1, wherein the main body is formed of multiple pieces of material attached to one another.

11. A fluid system for addressing flow separation having a first end and a second end, the fluid system comprising:

a main body having a first end, a second end, a lengthwise axis, a first portion, a second portion, an injection opening, a suction opening, a channel, a side wall, a first opening at the first end of the main body, a second opening at the second end of the main body, and a passageway extending from the first opening to the second opening;

the first portion disposed between the first end of the main body and the second end of the main body, the second portion extending from the first portion toward the second end of the main body, the first portion having a first axis extending along the side wall, the second portion having a second axis extending along the side wall at an angle relative to the first axis such that when fluid flows over the main body said flow separation is defined adjacent to the second portion;

the injection opening disposed between the first opening and the second opening and at a first location relative to said flow separation, the injection opening partially extending around the lengthwise axis and the passageway;

the suction opening disposed between the injection opening and the second opening and at a second location relative to said flow separation, the suction opening partially extending around the lengthwise axis and the passageway;

the channel extending from the suction opening to the injection opening; and a fluid pressurizer disposed within the channel and moveable between on and off states such that fluid flows into the suction opening and out of the injection opening when the fluid pressurizer is in the on state.

12. A fluid system for addressing flow separation having a first end and a second end, the fluid system comprising:

a main body having a first end, a second end, a lengthwise axis, a first portion, a second portion, an injection opening, a suction opening, a channel, a side wall, a first opening at the first end of the main body, a second opening at the second end of the main body, and a passageway extending from the first opening to the second opening;

the first portion disposed between the first end of the main body and the second end of the main body, the second portion extending from the first portion toward the second end of the main body, the first portion having a first axis extending along the side wall, the second portion having a second axis extending along the side wall at an angle relative to the first axis such that when fluid flows over the main body said flow separation is defined adjacent to the second portion;

the injection opening disposed between the first opening and the second opening and at a first location relative to said flow separation, the injection opening partially extending around the lengthwise axis and the passageway, the injection opening having a width that varies circumferentially around the lengthwise axis of the main body;

the suction opening disposed between the injection opening and the second opening and at a second location relative to said flow separation, the suction opening partially extending around the lengthwise axis and the passageway, the suction opening having a width that varies circumferentially around the lengthwise axis of the main body;

the channel extending from the suction opening to the injection opening; and a fluid pressurizer disposed within the channel and moveable between on and off states such that fluid flows into the suction opening and out of the injection opening when the fluid pressurizer is in the on state.

* * * * *